United States Patent
Sherman et al.

(10) Patent No.: US 7,275,729 B2
(45) Date of Patent: Oct. 2, 2007

(54) BOTTLE AND TOWEL HOLDER

(75) Inventors: Bruce A. Sherman, Beachwood, OH (US); Douglas R. Halley, Westlake, OH (US)

(73) Assignee: B + D Specialty Concepts, Inc., Beachwood, OH (US)

( * ) Notice: Subject to any disclaimer, the term of this patent is extended or adjusted under 35 U.S.C. 154(b) by 0 days.

(21) Appl. No.: 11/209,903

(22) Filed: Aug. 23, 2005

(65) Prior Publication Data

US 2006/0081749 A1 Apr. 20, 2006

Related U.S. Application Data

(63) Continuation-in-part of application No. 10/966,642, filed on Oct. 15, 2004, now abandoned.

(51) Int. Cl.
    *A47F 1/08* (2006.01)
    *A01K 97/04* (2006.01)
(52) U.S. Cl. .................. 248/311.2; 224/148.7; 224/197; 248/309.1
(58) Field of Classification Search ............. 248/311.2, 248/309.1, 314, 315, 215, 316.2, 316.7; 224/148.7, 224/680, 932, 197, 901, 459; 220/475, 737
See application file for complete search history.

(56) References Cited

U.S. PATENT DOCUMENTS

| | | | |
|---|---|---|---|
| 3,881,677 A * | 5/1975 | Ihlenfeld | 248/311.2 |
| 4,088,250 A * | 5/1978 | Schaefer | 224/235 |
| 4,809,890 A * | 3/1989 | Tsigadas | 224/435 |
| 5,105,958 A * | 4/1992 | Patton | 215/388 |
| 5,232,137 A * | 8/1993 | Devine | 224/666 |
| 5,419,154 A * | 5/1995 | Christoff | 62/457.3 |
| 5,622,296 A * | 4/1997 | Pirhonen et al. | 224/197 |
| 5,813,644 A * | 9/1998 | Bergin | 248/311.2 |
| 5,857,601 A * | 1/1999 | Greenwood | 224/409 |
| 5,947,322 A * | 9/1999 | Ho | 220/477 |
| D516,874 S * | 3/2006 | Haney et al. | D7/620 |
| 2006/0081747 A1* | 4/2006 | Sherman et al. | 248/309.1 |
| 2006/0284040 A1* | 12/2006 | Nixon et al. | 248/311.2 |

* cited by examiner

*Primary Examiner*—Carl D. Friedman
*Assistant Examiner*—Tan Le
(74) *Attorney, Agent, or Firm*—Dwight A. Stauffer

(57) ABSTRACT

Apparatus and method for a combined bottle and towel holder that can be removably attached to a variety of support structures such as are extant in an exercise or fitness room; and slip-resistant releasably self-adhering straps for the removable attachment. A bottle holding portion is an open topped receptacle, and a towel holding portion is an upward opening hook on the receptacle sidewall, optionally movably located relative to the location of the receptacle attachment to the support structure. The holder is removably attachable to a frame member in a way that substantially vertically orients the longitudinal axis of the receptacle, wherein the frame member is a bar of no particular cross-sectional shape, and is preferably upstanding but is oriented such that the bar's long axis is vertical, horizontal or at an angle between horizontal and vertical. The holder is also removably attachable to a vertical surface such as a wall.

14 Claims, 8 Drawing Sheets

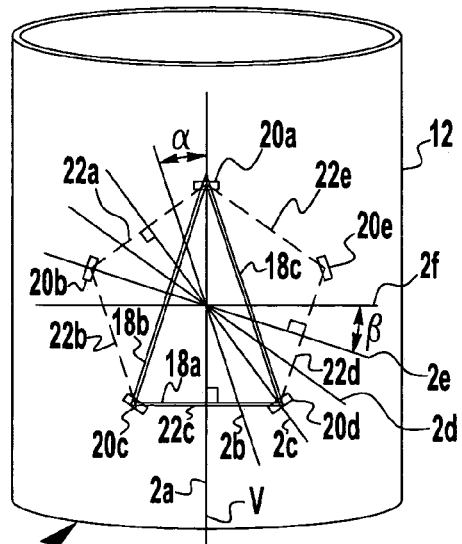
FIG. 3B
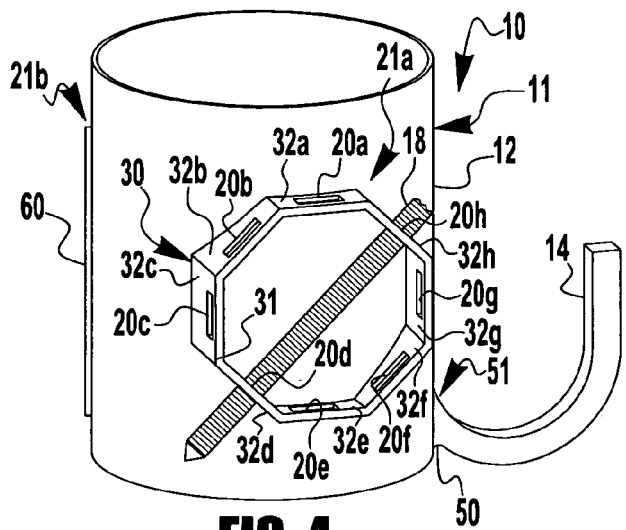
FIG. 4
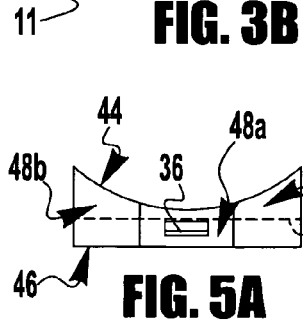
FIG. 5A
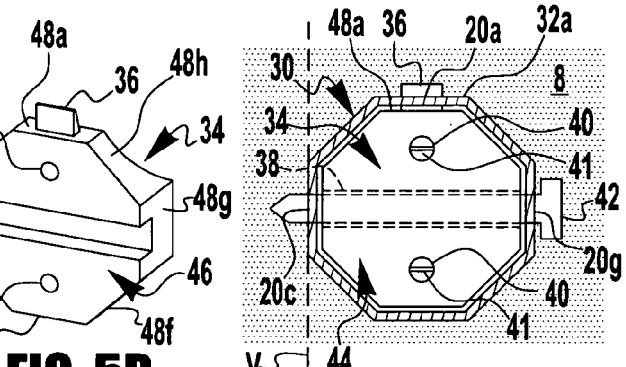
FIG. 5B
FIG. 6
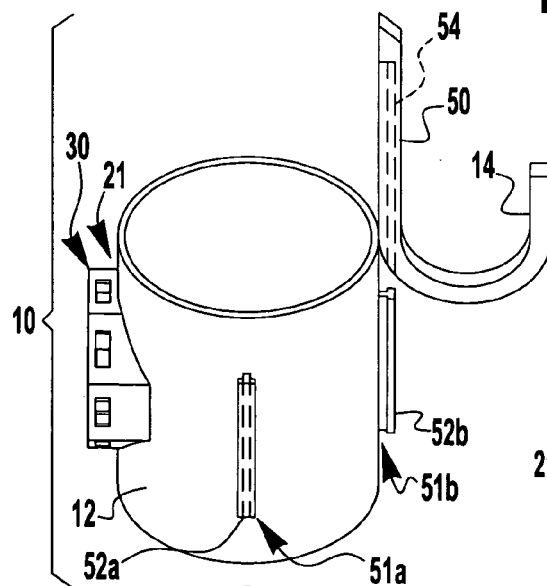
FIG. 7
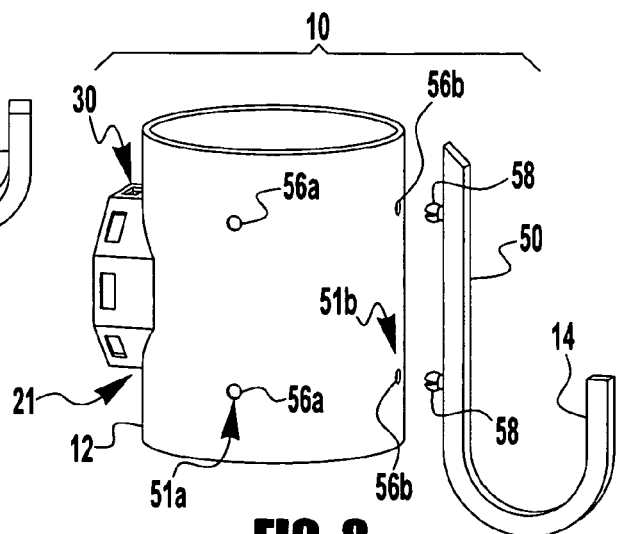
FIG. 8

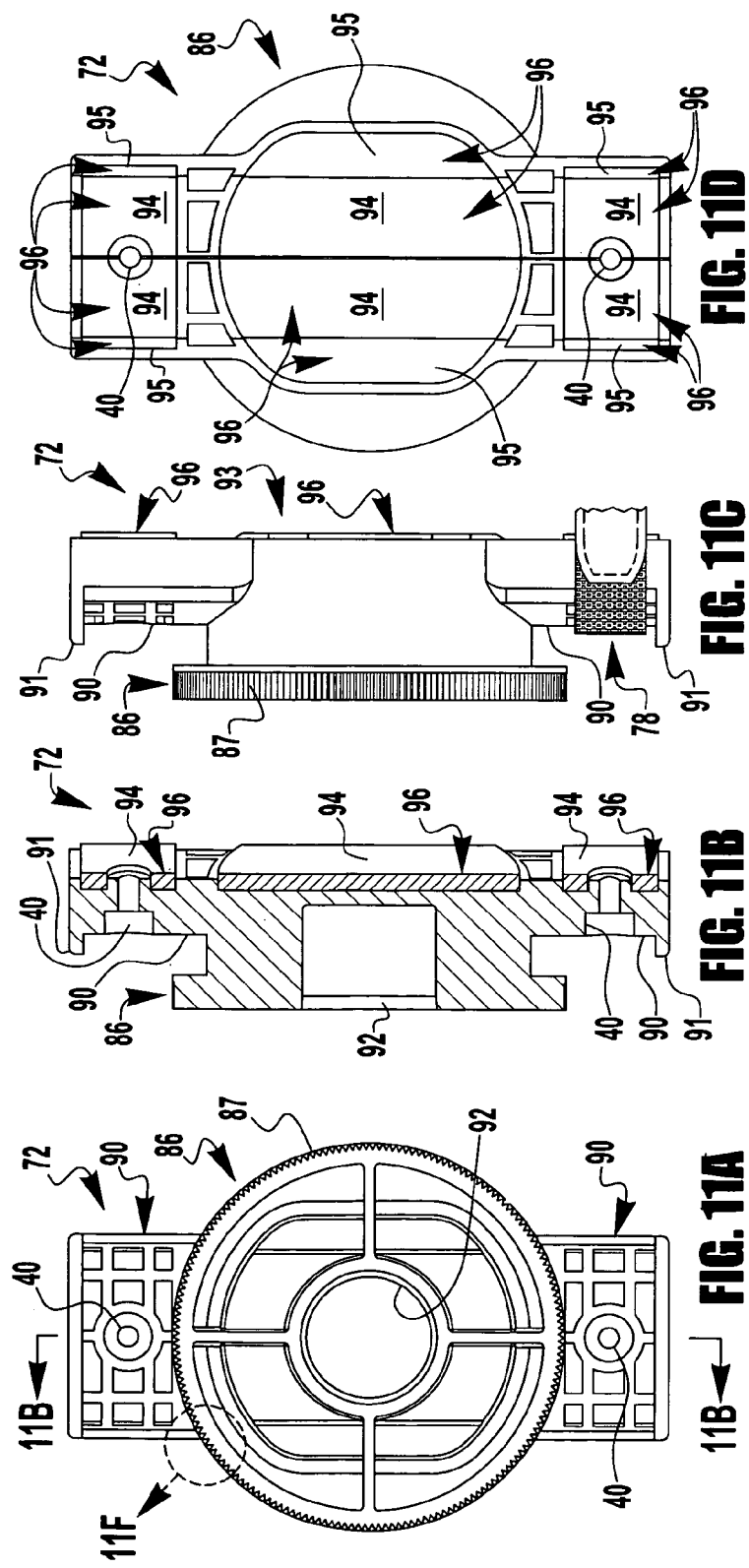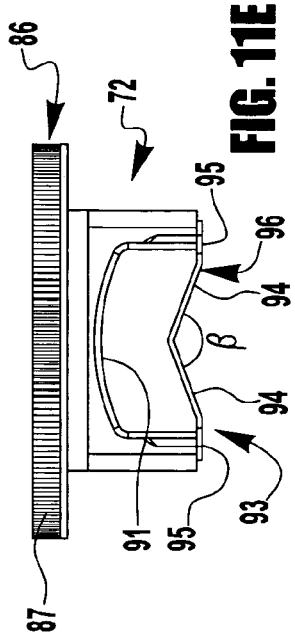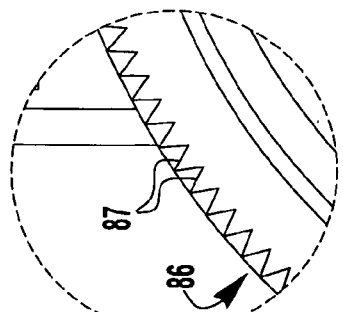

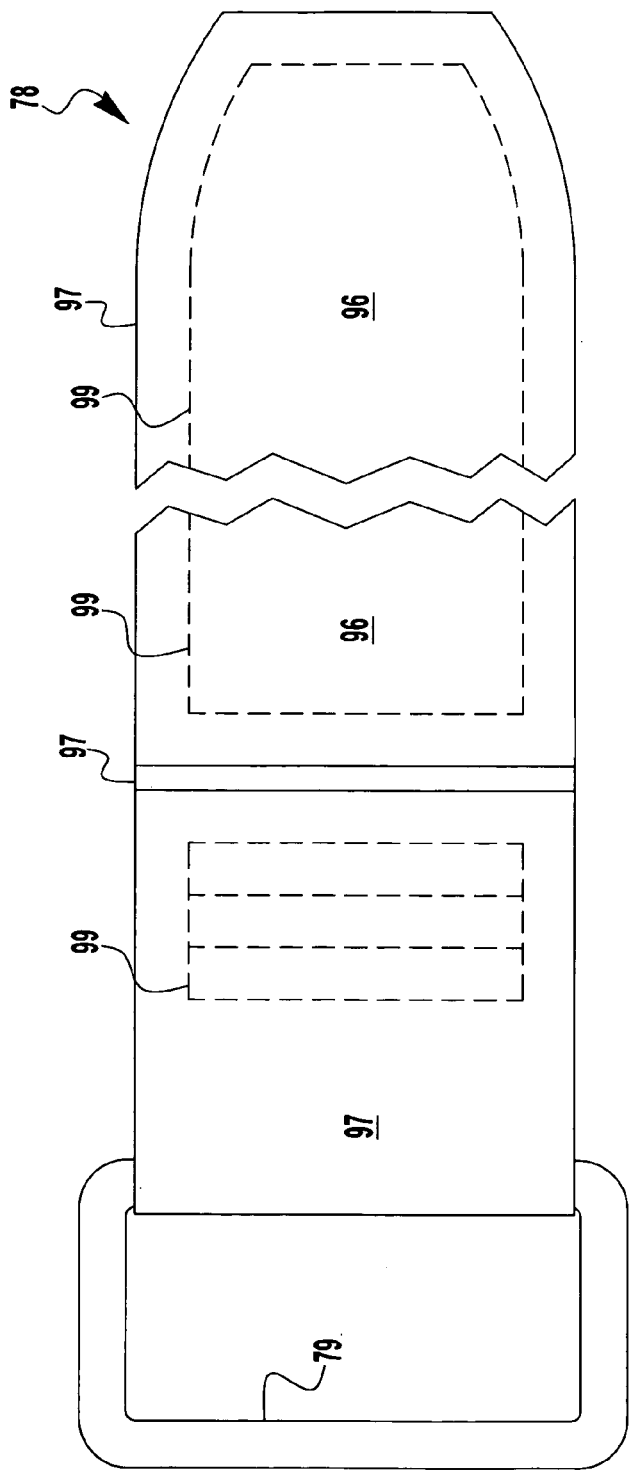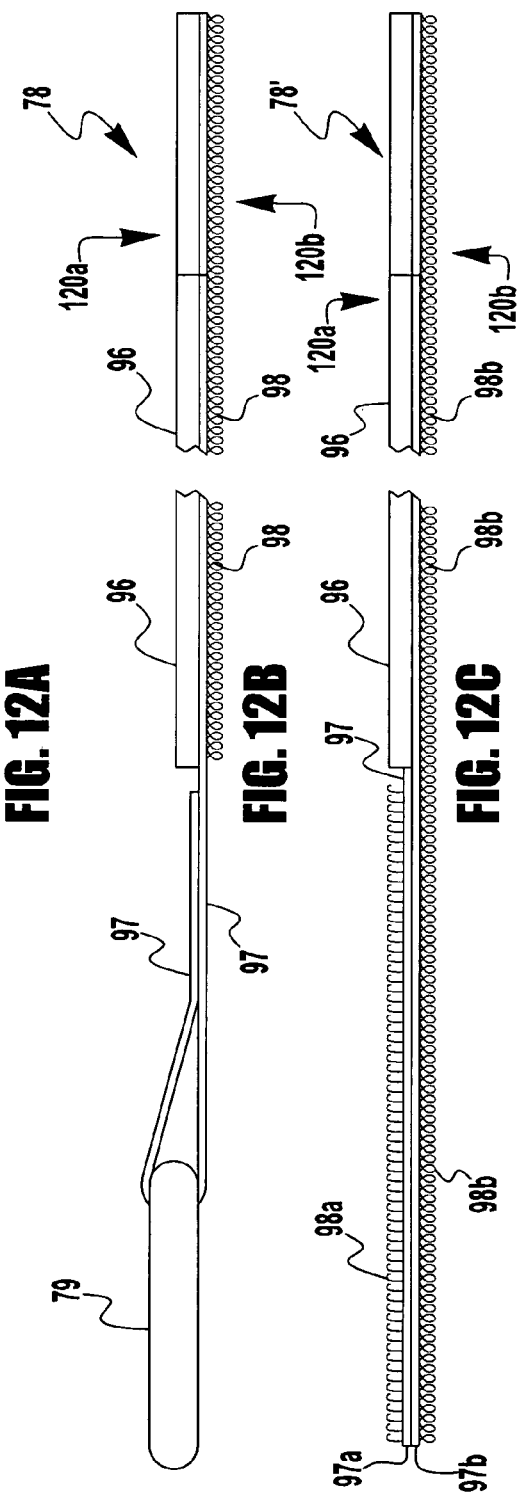
FIG. 12A
FIG. 12B
FIG. 12C

BOTTLE AND TOWEL HOLDER

CROSS-REFERENCE TO RELATED APPLICATIONS

This application is a continuation-in-part of commonly-owned U.S. patent application Ser. No. 10/966,642, filed Oct. 15, 2004 which is abandoned.

This application relates to U.S. patent application Ser. No. 11/209,901 (publication US-2006-0081748) entitled SLIP RESISTANT STRAP, having a filing date concurrent with that of the present application.

TECHNICAL FIELD OF THE INVENTION

The present invention relates to supports for a receptacle having a further support for a towel wherein the receptacle support is attachable to a variety of vertical structures.

BACKGROUND OF THE INVENTION

Fitness equipment (exercise devices) commonly become soiled during usage due to perspiration and other bodily secretions. When the equipment is shared by multiple persons, for example in a fitness center, it is desirable to spray a disinfectant/cleaning solution on affected portions of the equipment and then wipe off the solution and dissolved soil to clean the equipment between users. Many fitness centers provide spray bottles and hand towels for this purpose, but convenient placement of the bottles and towels can be problematic. Since multiple exercise devices can be scattered around a large room, placing bottles and towels in a central location (e.g., a freestanding cabinet or a wall shelf) is often unsatisfactory and inconvenient. Frequently, users will take the bottles and towels to their equipment for use before and/or after exercising, and tend to simply leave the bottles and towels on the floor by their equipment rather than returning them to the central location. Or, due to inconvenient bottle and towel placement, exercisers may choose not to use the disinfectant/cleaning solution at all. Thus, it is desirable to have a holder for both bottles and towels wherein the holder can be conveniently located at an exercise device.

A bottle and towel holder should require a minimum amount of space, should have a receptacle for preventing spilling of the bottle's contents, and should keep the bottle and towel off the floor where they might be in the way and create a safety hazard.

Combined spray bottle and paper towel holders are disclosed in U.S. Pat. No. 6,216,920 (Baggett, 2001), and U.S. Pat. No. 6,644,563 (Presson, 2003), wherein disposable paper towels are on a roll that is mounted on the spray bottle. Presson also discloses a hook apparatus (92, FIG. 14) to allow the invention to be hung for storage, the hook apparatus having a J-shaped hook (93) for hanging, and a pair of probes (94) for clipping in a groove (96) formed circumferentially around a reservoir cylinder (30). It appears that Baggett's device would be stored on the floor or on a counter or shelf.

U.S. Pat. No. 6,516,959 (Gribbins et al., 2003) discloses a caddy for storing cleaning equipment comprising a free standing pole on a base, with a bottle holder cup (14) and a hook (15) separately and permanently attached to the pole.

Since a free standing holder can take up valuable floor space, and would be relatively expensive due to the pole and a base heavy enough to prevent tipping, it is deemed to be desirable to have a compact assembly of a bottle receptacle and towel hook that can be attached directly to a variety of support structures such as are already extant in an exercise room. At least some of the exercise equipment devices will be near a wall, so attachment of the holder to a wall is desirable. However, since most exercise devices are typically not near a wall, it is more desirable that the holder have supports that are attachable to a frame member of the device, wherein an available frame member (located where the attached holder will not interfere with the use of the subject device or adjacent devices) typically could be a bar (either rectangular or circular in cross section) that is upstanding (i.e., lying in a vertical plane) but may be vertical, horizontal, or at an angle between horizontal and vertical.

U.S. Pat. No. 5,934,637 (Robinson, 1999) discloses a coin cup holder for a toilet stall. The cup holder is a flat horizontal plate with a hole in it, and has a swivel hook hanging therefrom. The cup holder is affixed to a vertical frame that has a second separately attached coat hook extending therefrom, and the frame is bolted to a toilet stall wall.

Since exercise devices are generally portable/freestanding, and additionally to simplify installation without affecting the integrity of a device's frame member, it is desirable for the holder to be removably attached to the frame member in a way that is simple and effective, without the need for drilling holes and using mounting screws.

Two patent references disclose receptacle and hook combinations which are supported by hanging from a hook, but the hook hanging method is most suitable for hanging from a grate or fence (e.g., chain link fence), or perhaps a small cross section horizontal bar with a vertical surface below to maintain verticality of the hanging holder. The hook hanging method is not likely to hold a spray bottle and towel in place on an exercise device, especially if the exercise device can shake or vibrate during use. U.S. Pat. No. 5,823,360 (Gorosave, 1998) discloses a device for holding sports equipment and other items. A receptacle (23) and a hook (34) are separately attached to a support member (27) having a hook (28) at its upper end for hanging from a chain link fence or similar structure. U.S. Pat. No. 6,053,340 (Cameron, 2000) discloses a sports equipment storage rack having a receptacle (30) on a vertical backboard (24), and a hook (36) extending from the receptacle. Attachment means include a hanging hole (42) for hanging on a peg or hook, and/or securing straps (52), possibly made of plastic, either affixed to the backboard or looped through holes (not shown, see col. 5, lines 48-56). The straps each have a securing hook (54) for clipping/hooking onto a chain link fence or similar structure (see col. 5, lines 34-65).

US patent documents disclose a variety of methods for attaching receptacles (e.g., bottle holders) to vertical or horizontal members such as posts or bars. Although they are adjustable to various size and shape members, the disclosed attachment methods have limited capability of being adapted for attachment to otherwise-oriented members.

U.S. Pat. No. 5,464,183 (McConnell et al., 1995) discloses a stroller accessory bar and drink holder. The bar has a separately attached hook (18, 20) and receptacle (22). The bar is generally horizontal and is removably attached to upstanding members of strollers, walkers, etc. by means of three sided resilient cushions (32) with straps (36, e.g., Velcro). Optional variations include semicircular snap members (112, 124, 202) or U-shaped members (202, 204), optionally also with straps (208). As seen in FIG. 1, it appears that an attachment means (14) can be angled to accommodate an upstanding bar that is angled outward from the vertical, but the angle's magnitude appears to be a fixed characteristic of the attachment means. As seen in FIGS. 3-5, varying attachment angles can also be accommodated by using a gimbaled receptacle such as the drink holder (22) which comprises an annular support (23) pivotally attached to a U-shaped support member (44).

U.S. Pat. No. 5,423,509 (LaPorte et al., 1995) discloses a combination beverage container and stereo holder. There is a round receptacle (22, 20) but no hook. The holder attaches to a round horizontal bar (40) of exercise equipment by wrapping attached hook and loop straps (24) around the bar such that the bar is strapped into an inverted V-shaped member (18) that is lined with a rubber gasket (19) for increased friction.

U.S. Pat. No. 6,086,031 (Renfro, 2000) discloses a gun and beverage support system having a receptacle (44, 46) and a separate hook (60, 70) attached to a base (20). The base has two pairs of eyelets (22, 24) protruding from the back. An elastic strap (e.g., shock cord or bungee strap) is used to encircle a vertical structure (e.g., a tree) by hooking into selected eyelets, wherein an inner pair of eyelets is selected for a narrow tree trunk and a wider pair for a bigger tree trunk.

U.S. Pat. No. 3,463,436 (Foster, 1967) discloses a "coaster," or beverage container holder, having a cup shaped member (receptacle) (11), but no hook. A tubular wall (12) is provided with two pairs of horizontally spaced apertures (15/16, 18/19) for a flexible linear member, e.g., a plastic beaded strip (17, 20), that is threaded through the apertures with both ends being on the outside to encircle a post (e.g., chair column 21) for securing the coaster to the post. Channels (24, 25) may be provided between paired apertures (e.g., between 15 and 16) to recess the flexible members into the inside surface of the receptacle. Alternatively, a vertical portion of the inner surface can be cut away ("tapered") (FIGS. 3, 4).

U.S. Pat. No. 5,042,770 (Louthan, 1991) discloses a beverage container holder having an open receptacle (14, 16), but no hook. An upright body portion (12) is provided with a plurality of transverse, vertically spaced slots (28, 30, 32) and pairs of vertical, horizontally spaced slots (34, 36) between the horizontal slots so that any one or a pair of the several slots may receive elongated strap-like members (e.g., 42, 48) having hook-and-loop fabric securing material bonded thereto for embracing structural elements (e.g., 52, 54, 62, car window not shown) or each other and maintaining the beverage holder in an upright position on any one of a plurality of vertical and/or horizontal structural elements.

Finally, when attaching a receptacle and hook onto a member of an exercise device, the towel hook should protrude in a way that is convenient for towel hanging, regardless of where the member is located relative to adjacent walls and/or other equipment or structures. Thus it is desirable that the location of the hook relative to the point of attachment of the receptacle to the member should be adjustable. The relevant prior art as discussed hereinabove does not provide such adjustability.

It is apparent from the prior art that when straps are employed to removably attach a holder to a member, particularly round and/or relatively slippery coated members, slipping of the holder is an issue in the design. In many cases, the part of the holder that contacts the member has a resilient (e.g., rubber) contact surface, no doubt for this reason, especially since hook and loop fabric is generally not very slip-resistant itself. In the case of the gun and beverage support system, the shock cord is made of a resilient extensible material stretched between end hooks, so the strap may provide some slip resistance.

It is an object of the present invention to overcome the limitations of the prior art in providing a combined bottle and towel holder that is a compact assembly that can be attached directly and easily to a variety of support structures such as are extant in an exercise room.

It is a further object that a bottle holding portion of the invention be an open topped receptacle suitable for holding a spray bottle, and a towel holding portion be a hook, preferably located conveniently on the side of the receptacle, more preferably movably located relative to the point of attachment of the receptacle to the support structure.

It is a further object that the holder be attachable to a frame member of equipment, wherein the frame member is a bar of no particular cross-sectional shape (e.g., rectangular or circular), is preferably upstanding (lying in a vertical plane) and is oriented vertically, horizontally or at an angle between horizontal and vertical. Preferably the holder is also attachable to a broad vertical surface such as a wall.

It is a further object to provide method and apparatus for preventing slippage of the holder when it is removably attached to a support member by a strap.

BRIEF SUMMARY OF THE INVENTION

According to the invention, a bottle and towel holder for mounting on a support structure comprises: a receptacle having a longitudinal axis, a lateral sidewall and an open top; a hook extending laterally outward from the sidewall; an inverted U shaped support ridge protruding laterally outward from the sidewall, the support ridge being semicircular at the top with a radially inward extending flange along the outer edge; and a radially inward extending locking tooth inside the top of the support ridge.

According to the invention, the bottle and towel holder further comprises: a lug comprising a circular disk with a plurality of radially outward extending teeth such that: the disk diameter and thickness are dimensioned to closely fit within the flanged support ridge; and the teeth will matingly engage with the locking tooth when the lug is fully inserted into the flanged support ridge.

According to the invention, the lug further comprises a screw hole for screw-attachment of the lug to the support structure. The lug may further comprise: a strap channel; and a strap for passing through the strap channel and then wrapping around a bar member of the support structure. Preferably the lug further comprises a back surface comprised of a low durometer elastomer layer. Further preferably, the lug back surface comprises a central concave V-shaped portion bookended at both lateral edges by flat portions.

According to the invention, the strap has a surface comprised of a low durometer elastomer layer. Preferably the strap further comprises: a ring clasp; and a flexible fabric that has one side covered with a releasably self-adhering component.

According to the invention, the bottle and towel holder further comprises: a latch hole recessed in the axial face of the disk; and a latch button on the sidewall that is biased laterally outward and positioned to engage with the latch hole when the lug is fully inserted into the support ridge. Preferably, the bottle and towel holder further comprises: a latch handle hidden inside the receptacle and attached to the latch button for disengaging the latch button by moving the latch button laterally inward in opposition to the bias.

According to the invention, the bottle and towel holder further comprises: an annular ring shaped cap that snaps onto the open top of the receptacle such that the cap hides the latch handle.

According to the invention, the bottle and towel holder further comprises: an annular ring shaped hook cap that snaps onto the open top of the receptacle; wherein: the annular ring has a cross-section that is concave opening downward, thereby forming a rounded top edge; and the hook is connected to the rounded top edge. Preferably, a shank of the hook is connected to the rounded top edge and extends downward with a shape that conforms to the shape of the sidewall.

According to the invention, the bottle and towel holder further comprises: a radially outward opening annular indentation or ridge around the open top of the receptacle; and a corresponding inward extending annular ridge or indentation, respectively, inside of a radially outer wall of the hook cap; wherein the annular ridge rotationally moveably mates with the annular indentation for enabling rotation of the hook cap and hook around the sidewall of the receptacle.

According to the invention, a method is disclosed for mounting a receptacle on a support structure, the receptacle having a longitudinal axis, a lateral sidewall and an open top, and the method comprising the steps of: attaching a multi-sided lug to the support structure; providing a multi-sided support ridge protruding laterally outward from the sidewall; shaping and dimensioning the lug and the support ridge to closely fit together; rotating the support ridge relative to the lug before matingly engaging the support ridge and the lug, thereby selecting a desired mounting angle between the longitudinal axis and a vertical line; and attaching the receptacle to the lug by matingly engaging the support ridge and the lug.

According to the invention, the method further comprises the steps of: shaping the support ridge as a regular polygon; engaging by laterally inserting the lug into the support ridge; and removably attaching the receptacle to the lug by passing a locking pin through holes in the support ridge and the lug.

According to the invention, the method further comprises the steps of: shaping the support ridge as an inverted U, being semicircular at the top with a radially inward extending flange along the laterally outer edge, and a radially inward extending locking tooth inside the top; shaping at least a portion of the lug as a circular disk wherein the multiple sides comprise a plurality of radially outward extending teeth such that the teeth will matingly engage with the locking tooth when the lug is fully inserted into the flanged support ridge; removably attaching the receptacle to the lug by engaging a spring biased latch on one part with a latch hole in the other part, the latch having a hidden release handle; forming a strap channel in the lug; and for removably attaching the lug to a bar member of the support structure, passing a strap through the strap channel and then wrapping the strap around the bar member.

According to the invention, the method further comprises the step of preventing slippage between the lug and the support structure by using a low durometer elastomer on one or both of the support structure-contacting surfaces of the lug and the strap.

According to the invention, the method further comprises the step of shaping the support structure-contacting back surfaces of the lug to comprise a central concave V-shaped portion bookended at both lateral edges by flat portions.

According to the invention, the method step of removably attaching the lug to a bar member of the support structure further comprises the steps of: providing a low durometer elastomer on a side of the strap, and a releasably self-adhering component on the opposed side of the strap; securing a ring at one end of the strap; and with the elastomer side facing inward, wrapping the strap around the strap channel of the lug and also around the bar member against which the lug is positioned, passing a free end of the strap through the ring, cinching the strap tight, laying the free end back on the wrapped part of the strap, and pressing for self-adherence.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Such relationships, if any, between similar elements in the same or different figures will become apparent throughout the specification, including, if applicable, in the claims and abstract.

Figure 1A:
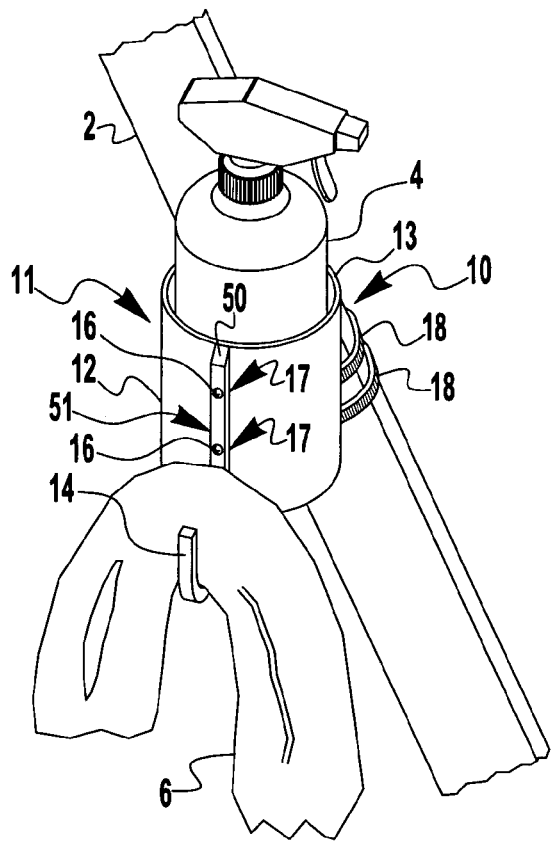
Figure 1B:
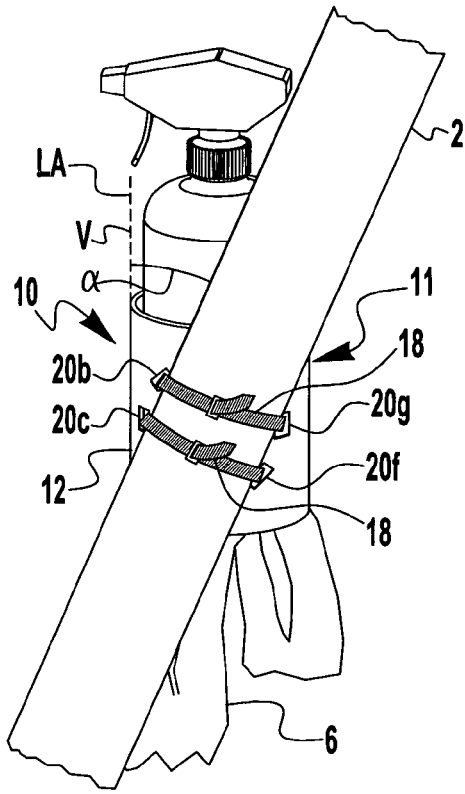
Figure 2:
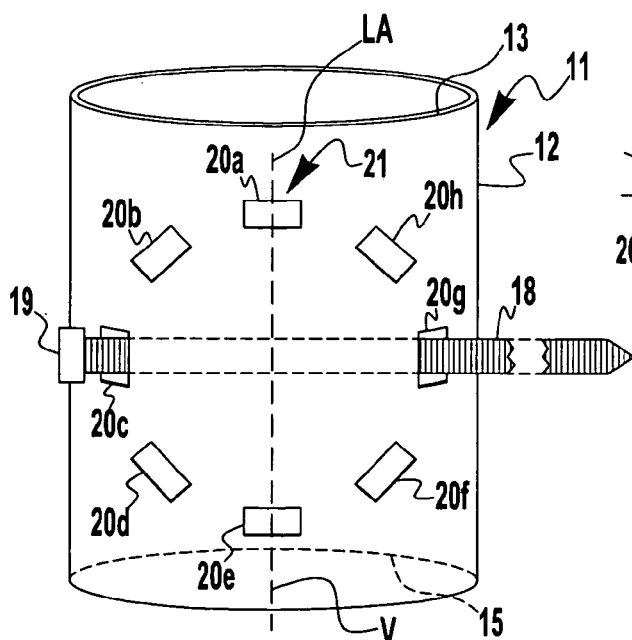
Figure 3A:
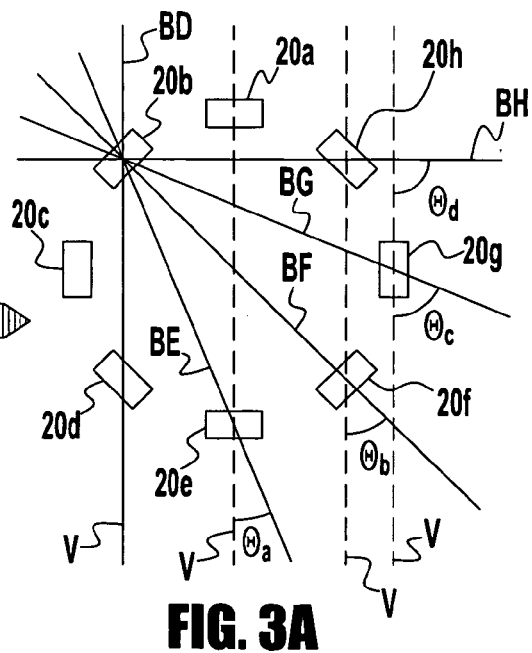
Figure 9:
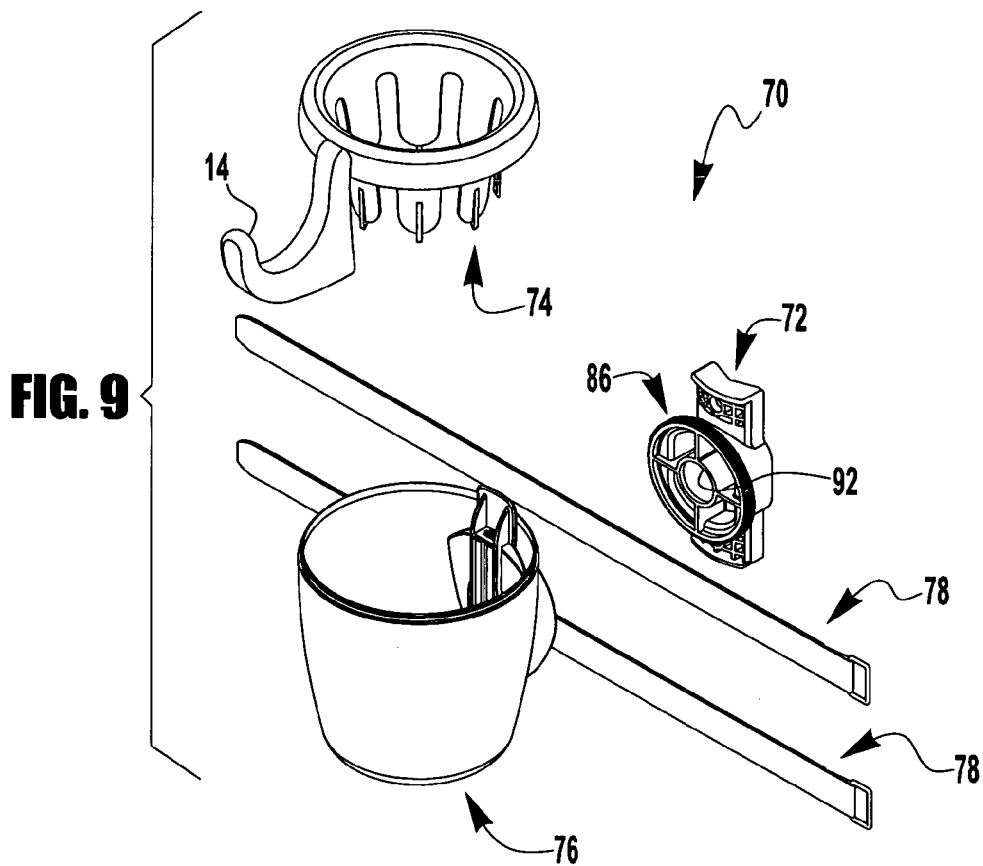
Figure 10A:
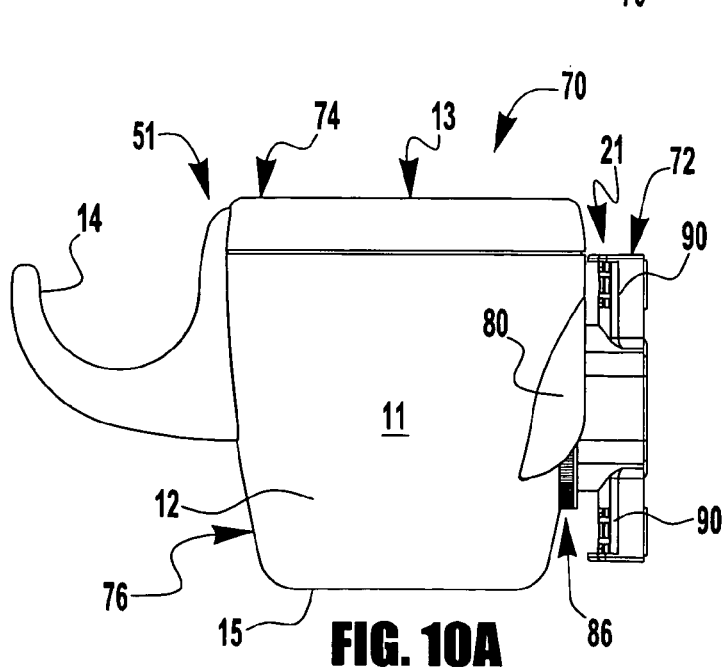
Figure 10B:
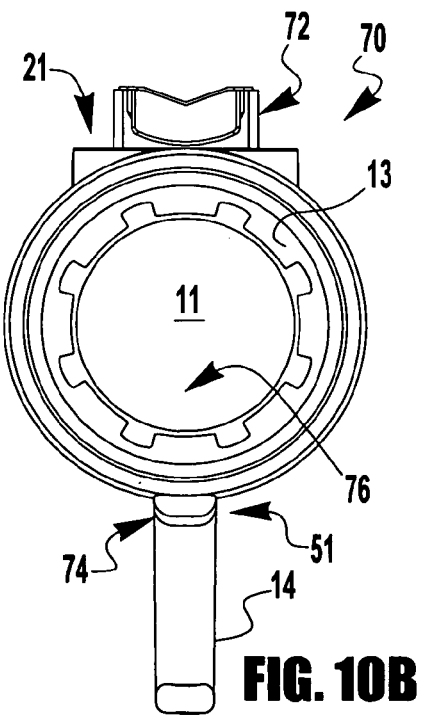
Figure 13A:
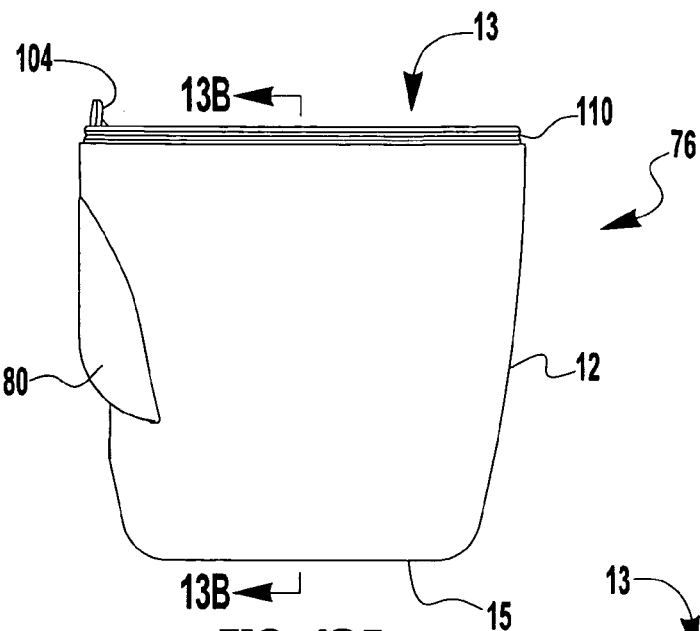
Figure 13B:
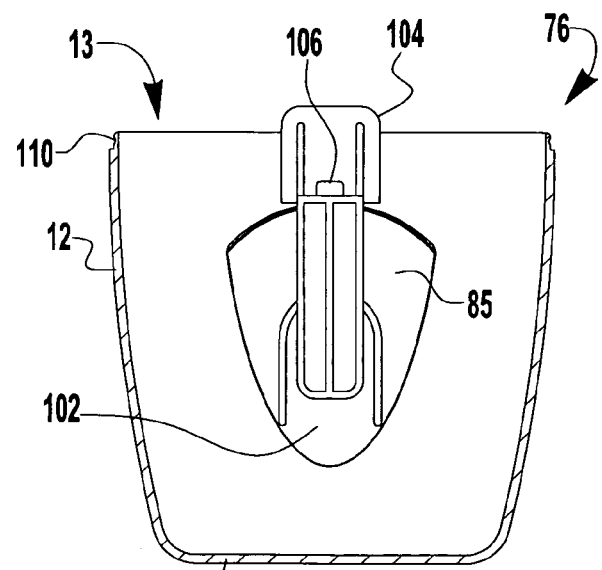
Figure 13C:
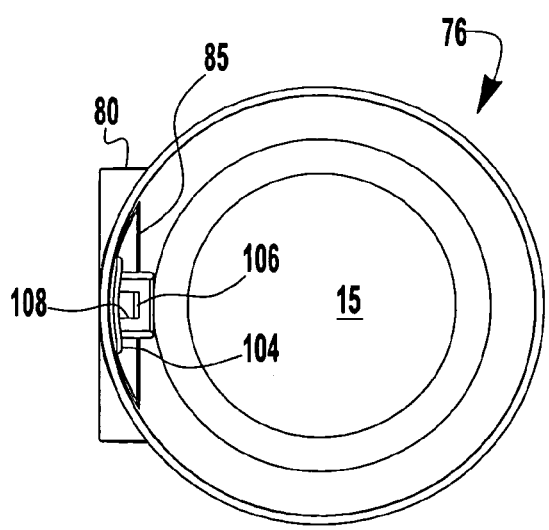
Figure 13D:
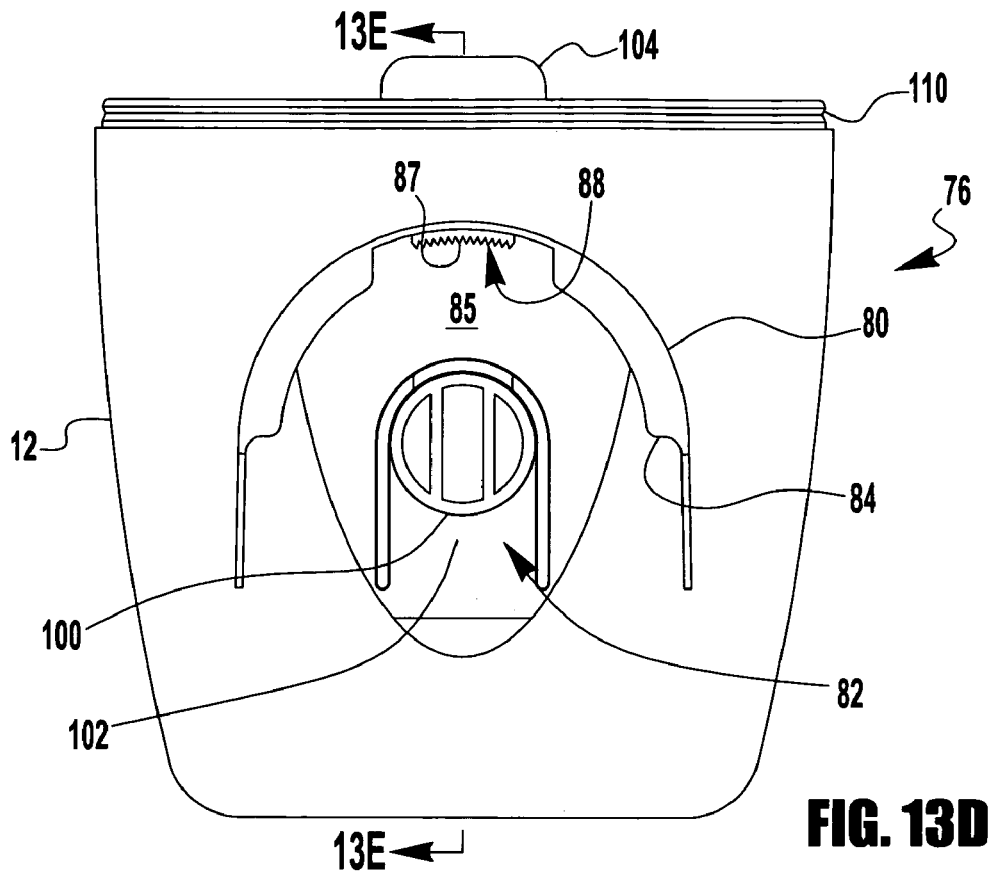
Figure 13E:
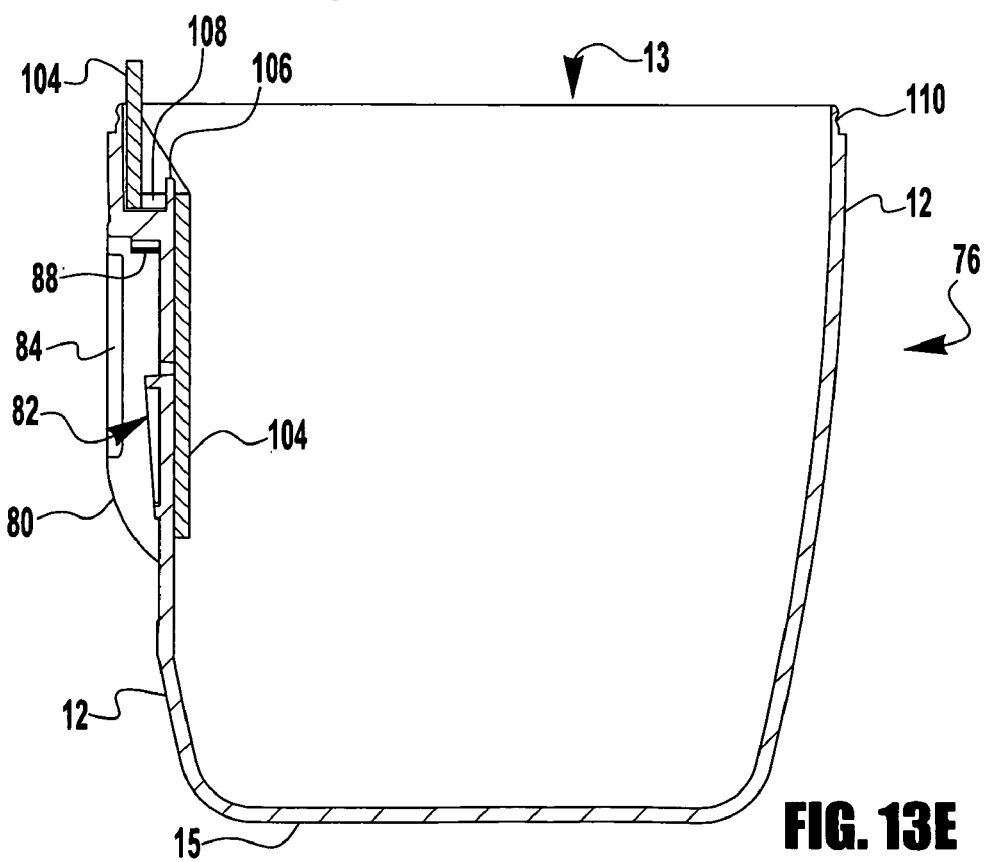
Figure 14A:
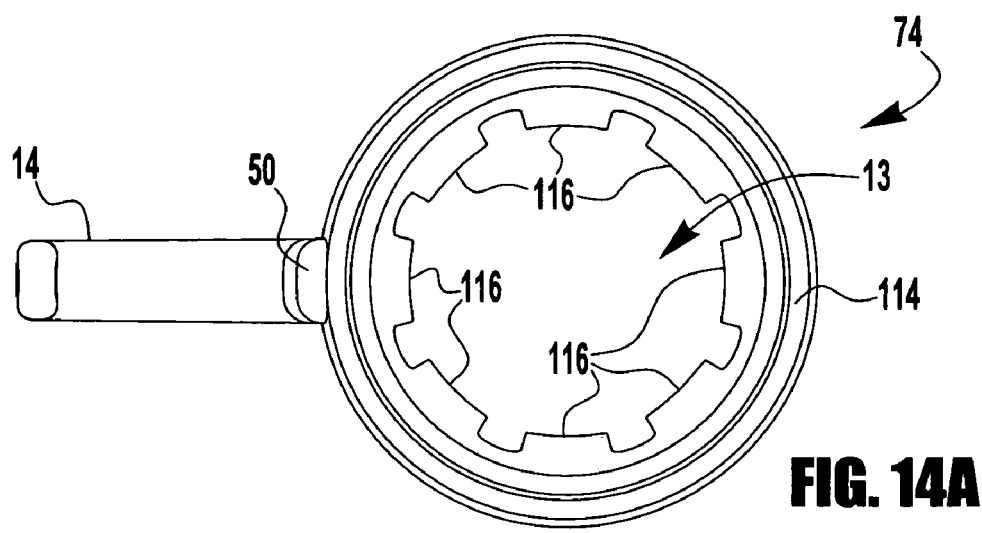
Figure 14B:
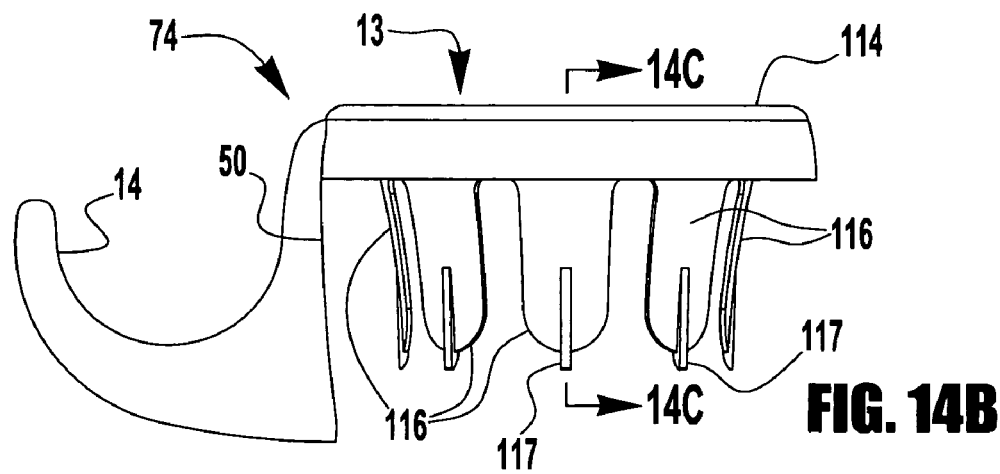
Figure 14C:
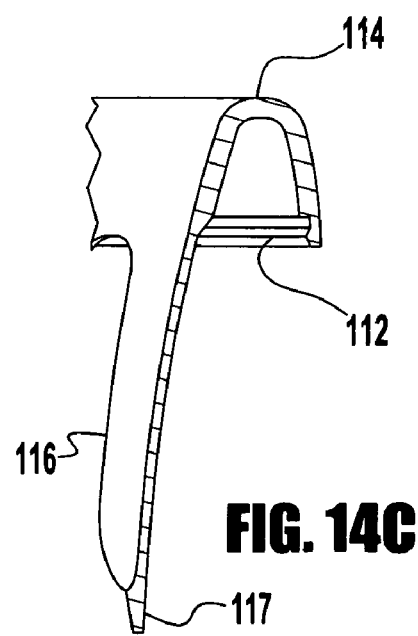

The structure, operation, and advantages of the present preferred embodiment of the invention will become further apparent upon consideration of the following description taken in conjunction with the accompanying drawings, wherein:

FIG. 1A is a perspective front view of a bottle and towel holder in use and removably attached to a support member, according to the invention;

FIG. 1B is a perspective rear view of the holder of FIG. 1A, according to the invention;

FIG. 2 is a side view of a receptacle portion of the holder of FIG. 1A showing a uniformly spaced circular arrangement of strap holes, according to the invention;

FIG. 3A is a schematic representation of the eight strap holes of FIG. 2, illustrating angular relationships for straps passing through various pairs of strap holes, according to the invention;

FIG. 3B is a schematic representation of a uniformly spaced circular arrangement of five strap holes, illustrating angular relationships of bars held by straps passing through various pairs of strap holes, according to the invention;

FIG. 4 is a side perspective view of a holder with a support ridge extending laterally from its sidewall, according to the invention;

FIG. 5A is a top view of a lug for removably attaching the holder of FIG. 4 to a support structure, according to the invention;

FIG. 5B is a perspective view of a mounting face of the lug of FIG. 5A, according to the invention;

FIG. 6 is a view of an outer face of the lug of FIG. 5A that is attached to a wall and shows a cross-sectional view of the support ridge of FIG. 4 removably attached to the lug, according to the invention;

FIG. 7 is a side perspective view of a holder with an embodiment of a movably mounted hook, according to the invention;

FIG. 8 is a side perspective view of a holder with another embodiment of a movably mounted hook, according to the invention;

FIG. 9 is an exploded perspective view of components of another embodiment of a holder, according to the invention;

FIGS. 10A and 10B are side and top views, respectively, of assembled components other than straps of the holder of FIG. 9, according to the invention;

FIGS. 11A-11E are front, side cross-sectional, side, back, and top views, respectively, of a strap lug component of the holder of FIG. 9, wherein the side cross-sectional view is taken along the line 11B-11B in FIG. 11A, according to the invention;

FIG. 11F is a magnified detail view of a circled area labeled 11F in FIG. 11A, according to the invention;

FIGS. 12A and 12B are top and side views, respectively, of a strap component of the holder of FIG. 9, according to the invention;

FIG. 12C is a side view of a second embodiment of the strap component of the holder of FIG. 9, according to the invention;

FIGS. 13A-13E are side, back cross-sectional, top, front, and side cross-sectional views, respectively, of a cup component of the holder of FIG. 9, wherein the back cross-sectional view is taken along the line 13B-13B in FIG. 13A and the side cross-sectional view is taken along the line 13E-13E in FIG. 13D, according to the invention; and FIGS. 14A-14C are top, side, and cross-sectional views, respectively, of a hook-cap component of the holder of FIG. 9, wherein the cross-sectional view is taken along the line 14C-14C in FIG. 14B, according to the invention.

DETAILED DESCRIPTION OF THE INVENTION

FIGS. 1A and 1B show front and rear views, respectively, of a typical application for the inventive combined bottle and towel holder 10 (generally referred to herein as a holder 10). A spray bottle 4 is held in a receptacle 11, and a towel 6 (e.g., a 12" by 24" hand towel) is held by a hook 14 that extends laterally outward from a sidewall 12 of the receptacle 11. The holder 10 is removably mounted on a bar type of support structure, which in this example comprises a rectangular cross-section bar 2 that is upstanding (i.e., lying in a vertical plane) but is tilted at a tilt angle α measured with respect to a vertical line V. Straps 18 pass through selected strap holes 20 (individual strap holes being designated as 20b, 20c, 20f, 20g, etc.) such that the holder 10 is approximately vertical (i.e., the sidewall 11 is approximately aligned with the vertical line V). The support structure bar 2 is, for example, a frame member of an exercise device, potentially including members that may be considered operational parts of the exercise device (e.g., a handlebar). The inventive holder 10 is not limited to a bar 2 of any particular cross-sectional profile. The straps 18 are preferably plastic cable ties with an integral clasp 19 for simple and secure strapping. Other forms of the strap 18 and clasp 19 may be used (e.g., hook-and-loop clasping fabric straps), but even inexpensive cable ties as illustrated should be considered as "removable attachments" since a fastened strap 18 can be cut, removed, and replaced with a new cable tie for refastening/reattachment.

Referring also to FIG. 2, the receptacle 11 has an open top 13, a lateral sidewall 12, and a closed bottom 15. In the illustrated preferred embodiment, the sidewall 12 is circular in cross section about a longitudinal axis LA and is dimensioned to removably hold, for example, a round 32 ounce spray bottle. The shape and dimensions of the receptacle 12 are not important as long as some form of open topped receptacle is provided and as long as a portion of the sidewall 12 has strap holes 20 according to the invention as further described hereinbelow. Thus the sidewall 12 may otherwise be open, mesh-like, etc., and the bottom 15 may be, for example, in the form of a grate for draining liquids and dirt. For example, the receptacle 11 could be a wire frame shaped to hold a rectangular portable music player, as long as a portion of the sidewall 12 of the frame provides strap holes 20 according to the invention.

FIG. 2 illustrates a preferred embodiment of the inventive strap holes 20 wherein three or more strap holes 20 are configured in a circular arrangement, i.e., spaced (preferably uniformly) around a circle. The strap holes 20 can be any shape, e.g., circular, but are rectangular slots in the preferred embodiment, such that rectangular cross section straps 18 can pass through selected pairs of strap holes 20. The circular arrangement of strap holes 20 provides a plurality of strap hole pairs wherein each hole of the pair is aligned with the other across the circular arrangement, thereby making it possible to pass a strap 18 through the two strap holes 18 of the pair. The term "circular arrangement" as used herein is intended to be interpreted loosely. For example, the strap holes 20 may be arranged only approximately on a circle that is deformed as it is mapped onto a cylindrical sidewall 12. For example, slot-shaped strap holes 20 will appear to be arranged in a polygonal arrangement, although the centers of the strap holes 20 will still lie approximately on a circle of approximately uniform diameter. Thus the preferred embodiment of strap holes 20 is a uniformly spaced circular arrangement of strap holes 20. In other words, a quantity N of strap holes 20 is preferably arranged such that the strap holes 20 are located at the N vertices of an N-sided regular polygon (equal length sides forming the same angle at each vertex).

As illustrated in FIG. 2, the circular arrangement of strap holes 20 comprises eight slots (first strap hole 20a, second strap hole 20b, third strap hole 20c, fourth strap hole 20d, fifth strap hole 20e, sixth strap hole 20f, seventh strap hole 20g, and eighth strap hole 20h) that are cut through the sidewall 12. The eight strap holes 20 are shown with the preferred uniform spacing between adjacent strap holes 20, i.e., strap holes 20 are spaced 360/8 equals 45° (degrees) apart. Also preferably, at least one of the strap holes 20 is located on a line parallel to the longitudinal axis LA of the receptacle 12. Then, when the receptacle 12 is vertical (it's longitudinal axis LA is parallel to a vertical reference line V) at least one of the strap holes 20 will be on the vertical line V. As will be seen, the preferred uniformly spaced circular arrangement of at least three strap holes 20 enables a method for attachment of the receptacle 12 to vertical, horizontal, and in-between angled (non-vertical and non-horizontal) support structure members 2 while maintaining the receptacle 12 in an approximately vertical orientation, most exactly if at least one of the strap holes 20 is located as preferred on a line parallel to the longitudinal axis LA of the receptacle 12. The quantity of strap holes 20 determines which in-between tilt angles α can be so accommodated.

FIG. 3A illustrates a uniformly spaced circular arrangement of eight strap holes 20 according to a preferred embodiment of the invention. The strap holes 20 are oriented vertically, therefore because of the uniform spacing of eight holes, several pairs of strap holes 20 are on a vertical line V. The first strap hole 20a and the fifth strap hole 20e lie on the same vertical line V. Likewise, the second strap hole 20b and the fourth strap hole 20d are both on another instance of a vertical line V; likewise the sixth strap hole 20f and the eighth strap hole 20h are both on yet another instance of a vertical line V.

The strap 18 in FIG. 2 passes in through the third strap hole 20c and out through the seventh strap hole 20g (i.e., passing through a pair of strap holes 20c/20g), and can obviously thence be wrapped around a vertical bar 2 for attaching the receptacle 12 in a vertical orientation. One advantageous aspect of the present invention is that with multiple strap holes 20 as described, straps 18 can additionally or alternatively be passed through other pairs of strap holes (e.g., 20b/20h and/or 20d/20f), thereby providing additional holding power, alternative strap locations, strapping for smaller width bars 2, and possibly other advantages.

Consideration of FIG. 3A reveals another advantageous aspect of the present invention in terms of attaching the receptacle 12 to upstanding support members 2 that are oriented at various tilt angles α. For example, a line BH represents the idealized path of a strap 18 that passes through the pair of strap holes 20b/20h (second strap hole 20b and eighth strap hole 20h). The line BH is horizontal, i.e., at a BH strap angle θd that is 90° with respect to the vertical line V. A strap 18 that follows the line BH will attach the receptacle 12 in a vertical orientation to a bar 2 that is perpendicular to the line BH, i.e., a vertical bar. As detailed above, parallel straps 18 may also be passed through strap hole pairs 20c/20g and 20d/20f.

In another example, a line BD represents the idealized path of a strap 18 that passes through the pair of strap holes 20b/20d (second strap hole 20b and fourth strap hole 20d). The line BD is vertical, i.e., at a BD strap angle (not shown) that is 0° with respect to the vertical line V (parallel). A strap 18 that follows the line BD will attach the receptacle 12 in a vertical orientation to a bar 2 that is perpendicular to the line BD, i.e., a horizontal bar. Parallel straps 18 may also be passed through strap hole pairs 20a/20e and 20h/20f.

In another example, a line BE represents the idealized path of a strap 18 that passes through the pair of strap holes 20b/20e (second strap hole 20b and fifth strap hole 20e). The line BE is at a BE strap angle θa that is 22.5° with respect to the vertical line V. A strap 18 that follows the line BE will attach the receptacle 12 in a vertical orientation to a bar 2 that is perpendicular to the line BE, i.e., a bar that is at a 67.5° angle with respect to the vertical line V. Parallel straps 18 may also be passed through strap hole pairs 20c/20d, 20a/20f and 20h/20g.

In another example, a line BF represents the idealized path of a strap 18 that passes through the pair of strap holes 20b/20f (second strap hole 20b and sixth strap hole 20f). The line BF is at a BF strap angle θb that is 45° with respect to the vertical line V. A strap 18 that follows the line BF will attach the receptacle 12 in a vertical orientation to a bar 2 that is perpendicular to the line BF, i.e., a bar that is at an opposed 45° angle with respect to the vertical line V. Parallel straps 18 may also be passed through strap hole pairs 20c/20e, and 20a/20g.

In another example, a line BG represents the idealized path of a strap 18 that passes through the pair of strap holes 20b/20g (second strap hole 20b and seventh strap hole 20g).

The line BG is at a BG strap angle θc that is 67.5° with respect to the vertical line V. A strap 18 that follows the line BG will attach the receptacle 12 in a vertical orientation to a bar 2 that is perpendicular to the line BG, i.e., a bar that is at a 22.5° angle with respect to the vertical line V. Parallel straps 18 may also be passed through strap hole pairs 20a/20h, 20c/20f and 20d/20e.

By similar reasoning, it can be seen that straps 18 passing through other pairs of strap holes (e.g., 20h/20d) can be used to attach the receptacle 12 in a vertical orientation to an upstanding bar 2 that is oriented at any multiple of 22.5° with respect to the vertical line V (assuming that the strap holes 20 are circularly arranged with uniform spacing, and at least one pair of the strap holes 20 lies on either a vertical or a horizontal line).

If each strap hole 20 is made large enough to accommodate two straps 18, then further extension of the above teaching reveals that a bar 2 can be held parallel to any pair of strap holes 20 (e.g., 20e/20g) using two straps 18 emanating from a single triangularly-opposed strap hole 20 (e.g., 20b) and then passing through the two strap holes 20 (e.g., 20e/20g following the strap lines BE and BG). Using this technique with eight strap holes 20a-20h provides alternative ways to attach the receptacle 12 in a vertical orientation to an upstanding bar 2 that is oriented at any multiple of 22.5° with respect to the vertical line V (assuming that the strap holes 20 are circularly arranged with uniform spacing, and at least one pair of the strap holes 20 lies on either a vertical or a horizontal line).

In summary, according to the method of the present invention, use of one or more straps 18 with a quantity N of strap holes 20 (e.g., N=8 in FIG. 3), wherein the strap holes 20 are circularly arranged with uniform spacing, and at least one pair of the strap holes 20 lies on either a vertical or a horizontal line, will attach the receptacle 12 in a vertical orientation to an upstanding bar 2 that is tilted at a tilt angle α that is any multiple of 360/2N degrees (360° divided by two times N) with respect to the vertical line V if the quantity N is an even number, and 360/4N degrees if the quantity N is an odd number. This calculation holds true for as few as three strap holes 20. In table form, a minimum increment β of the bar tilt angle α that can be accommodated by a circular arrangement of a quantity N of strap holes 20 is as follows:

| N | BAR TILT ANGLE INCREMENT β |
|---|---|
| 3 | 30° |
| 4 | 45° |
| 5 | 18° |
| 6 | 30° |
| 7 | 12.9° |
| 8 | 22.5° |

The reason that the calculation is different for an odd quantity N of strap holes 20 will become apparent with reference to FIG. 3B, which illustrates a uniformly spaced circular arrangement of an odd quantity N of five strap holes 20 (first strap hole 20a through fifth strap hole 20e) that are in the sidewall 12 of a receptacle 11 having a longitudinal axis V that is also a vertical reference line V. A first strap 18a is shown passing through the third strap hole 20c and the fourth strap hole 20d, thereby forming a third side 22c that is one of five sides 22 of a five-sided regular polygon (i.e., a pentagon) defined by vertices that are the centers of the five strap holes 20. The third side 22*c* is intentionally oriented to be perpendicular to the vertical reference line V, therefore the first strap 18*a* will hold onto a first bar 2*a* that is vertical (the bar being represented in the drawing by its centerline for illustrative clarity). A sixth bar 2*f* is horizontal and is therefore parallel to the third side 22*c*, and can be held in place by two straps 18, shown by a second strap 18*b* which emanates from the third strap hole 20*c* and passes to the first strap hole 20*a*; and a third strap 18*c* which emanates from the fourth strap hole 20*d* and passes to the first strap hole 20*a*. It can be seen that equivalent strapping effects can be obtained by passing the second strap 18*b* and the third strap 18*c* to strap holes 20 (e.g., 20*b*, 20*e*) other than the first strap hole 20*a*, as long as the second and third straps 18*b*, 18*c* still emanate from the third and fourth strap holes 20*c*, 20*d*. In general: a bar 2 can be held perpendicular to a pair of strap holes 20 (e.g., a side 22) by a strap 18 that passes between the strap holes 20 on either end of the pair (e.g., side 22); and a bar can be held parallel to a pair of strap holes 20 (e.g., a side 22) by two straps 18, one of which emanates from each of the strap holes 20 on either end of the pair (e.g., side 22).

By similar reasoning, it can be seen that a second bar 2*b* can be held parallel to the second side 22*b*; a third bar 2*c* can be held perpendicular to the first side 22*a*; a fourth bar 2*d* can be held parallel to the fifth side 22*e*; and a fifth bar 2*e* can be held perpendicular to the fourth side 22*d*. Thus each quadrant of the regular pentagon is divided into five equal segments, each having a bar tilt angle increment β of (360/(4×5)) degrees=18°.

Furthermore, it can be geometrically proven that any line passing between non-adjacent vertices of an odd-sided regular polygon will be parallel to at least one side (between adjacent vertices) of that polygon. Therefore, for example, the second strap 18*b* is parallel to the fourth side 22*d* and hold the fifth bar 2*e* equivalently to a strap 18 passing along the fourth side 22*d*.

It should be noted that for the odd N-sided regular polygon depicted in FIG. 3B, the sixth bar 2*f* is not perpendicular to any line between any two strap holes 20. In general: for any odd N-sided regular polygon, the two strap holes 20 (e.g., 20*c*, 20*d*) on the ends of each side 18 (e.g., 18*a*) can be used to hold a bar 2 that is both perpendicular (e.g., 2*a*) and parallel (e.g., 2*f*) to the side 18 (e.g., 18*a*), and each of these bars (e.g., 2*a*, 2*f*) will be at a bar tilt angle α that is uniquely determined by that side (e.g., 18*a*). Thus the odd quantity N sides will contribute two times N diametrical lines, or two times two times N radial lines that are equally spaced around the polygon to produce a bar tilt angle increment β of (360/(4×N)) degrees.

In contrast, it can be seen by examining the eight-sided regular polygon formed by the strap hole 20 pattern in FIG. 3A, that for any even N-sided regular polygon, each side 18 is parallel to another side 18. Therefore each bar 2 can be held parallel to two of the sides 18, and by extension, perpendicular to two of the sides 18. Furthermore, since each side's perpendicular line is equivalent to another side's parallel line, the N sides can only contribute N/2 unique diametrical lines. Further similar analysis reveals that straps 18 passing through non-adjacent strap holes 20 (e.g., 20*b*, 20*d*) can contribute another N/2 unique diametrical lines. Thus for an even quantity N-sided regular polygon, there are N/2 plus N/2 equals N diametrical lines, or two times N radial lines that are equally spaced around the polygon to produce a bar tilt angle increment β of (360/(2×N)) degrees.

Although a smaller bar tilt angle increment β can be obtained for seven strap holes 20 than for eight, the increment β of 22.5° is easier for most people to conceptualize than 12.9°, and is usually adequate to obtain at least approximately vertical orientation for a receptacle 11 attached to almost any upstanding bar 2. Therefore a uniformly spaced circular arrangement of eight strap holes 20 is the preferred embodiment of the invention.

The strap holes 20 in the sidewall 12 of the receptacle 11 illustrated in FIG. 2 pass through the sidewall 12 such that a strap 18 passing through a pair of strap holes 20 must pass through the interior of the receptacle 11. Since it may be desirable to avoid this, FIG. 4 illustrates an alternative way to provide strap holes 20 in the sidewall 12 of a receptacle 11, e.g., of the bottle and towel holder 10. A circularly arranged support ridge 30 protrudes laterally outward from the sidewall 12, and three or more (preferably eight) circularly arranged strap holes 20 cut through the support ridge 30 tangentially to the sidewall 12. Preferably an outside edge 31 of the support ridge 30 is flat rather than curved like the cylindrical sidewall 12. In order to provide the preferred uniformly spaced circular arrangement of strap holes 20, the support ridge 30 can be circular, but is preferably the shape of a regular polygon with a ridge side 32 for each strap hole 20, which is preferably located in the approximate center of the length of its ridge side 32. In any case, the support ridge 30 is considered to be "circularly arranged" in the same general sense that the strap holes 20 are circularly arranged. It is also within the scope of the present invention for the support ridge 30 to be discontinuous, for example a circular arrangement of laterally protruding eyelets.

For the arrangement of eight strap holes 20 shown in FIG. 4, the support ridge 30 is shaped as a regular octagon wherein a first ridge side 32*a* has a first strap hole 20*a* through it, a second ridge side 32*b* has a second strap hole 20*b* through it, a third ridge side 32*c* has a third strap hole 20*c* through it, a fourth ridge side 32*d* has a fourth strap hole 20*d* through it, a fifth ridge side 32*e* has a fifth strap hole 20*e* through it, a sixth ridge side 32*f* has a sixth strap hole 20*f* through it, a seventh ridge side 32*g* has a seventh strap hole 20*g* through it, and an eighth ridge side 32*h* has an eighth strap hole 20*h* through it. A portion of an exemplary strap 18 is shown passing through the pair of strap holes comprising the fourth/eighth strap holes 20*d*/20*h*, and it can be seen that the strap 18 passes across the exterior of the receptacle 11, i.e., tangentially to the sidewall 12.

As detailed hereinabove, one or more straps 18 can be passed through selected pairs of strap holes 20 for attaching the receptacle 11, and therefore the holder 10, to a support structure that is a bar 2. FIGS. 5A, 5B and 6 illustrate an embodiment of an apparatus and method for removably attaching the holder 10 to a support structure that may not allow for attachment by means of the strap 18, for example a relatively flat, upstanding surface such as a wall 8. A lug 34 is, for example, a molded plastic part. The lug 34 is sized and shaped to fit within the support ridge 30, so for the illustrated example the lug 34 has eight lug sides 48*a*-48*h* (collectively referred to as lug sides 48) formed as a regular octagon such that a first lug side 48*a* corresponds to, and fits within, the first ridge side 32*a*, and so on through an eighth lug side 48*h* that corresponds to, and fits within, the eighth ridge side 32*h*. The lug 34 has two faces: an outer face 44 is preferably curved to conform to the cylindrically curved sidewall 12 of the holder 10, and a mounting face 46 is preferably approximately flat for stable mounting on a flat surface such as the wall 8. One or more screw holes 40 may be provided for screw attachment of the lug 34 to the wall 8. Of course other attachment means could be employed such as nails, adhesive, etc.

FIG. 6 shows the lug 34 attached to a wall 8 by screws 41 that pass through the screw holes 40 before being screwed into the wall 8. A holder 10 has been hung on the wall-mounted lug 34 by fitting the support ridge 30 (shown in cross-section) around and over the lug 34. The lug 34 can be oriented vertically when it is attached to the wall 8 so that the holder 10 will automatically also be vertical when it is hung on the lug 34. To assist in hanging the holder 10, a tab 36 (preferably wedge-shaped) optionally protrudes from the top-oriented first lug side 48a such that the tab 36 will pass through the first strap hole 20a in the top-oriented first ridge side 32a whenever the holder 10 is hung on the lug 34 by fitting the support ridge 30 of the holder 10 around and over the lug 34. Alternatively, there could be two or more tabs 36 on different lug sides 48, at least some of which are spring biased for popping out into the strap holes 20 as the support ridge 30 is pressed onto the lug 34.

As a preferred method for removably attaching the holder 10 to the wall 8, a channel 38 is formed in the lug 34, opening at two opposed lug sides 48 (e.g., third lug side 48c and seventh lug side 48g), the channel 38 optionally being open across the mounting face 46. The channel 38 aligns with strap holes 20 (e.g., 20c/20g) in the corresponding ridge sides 32 (e.g., 32c/32g) when the holder 10 is hung on the lug 34 such that a locking pin 42 can be pushed through the strap holes 20 (e.g., 20c/20g) and the channel 38, thereby preventing movement of the supporting ridge 30 away from the lug 34 and the wall 8.

The lug 34 is not limited to being shaped the same as the support ridge 30 as long as the lug 34 fits inside the support ridge and provides a functional equivalent to the channel 38. For example, the lug 34 could be an inverted triangle with a base that forms the first lug side 48a; for example, the lug 34 could be an X-shaped web whose points fit into four vertices of the support ridge 30.

Although the lug 34 is illustrated as being attached on a wall 8, it is within the scope of the present invention to attach the lug 34 on any support structure, for example on a bar 2. An advantage of using the lug 34 for attachment even when a strap 18 could be used is one of improved flexibility since the lug 34 can be attached in a vertical orientation on any upstanding support member (e.g., a bar 2) regardless of the tilt angle α of the support member (e.g., bar 2).

The hook 14 is preferably plastic, either molded or extruded and formed. The hook 14 is, for example, sized to hold a typical 12"×24" terry hand towel that is draped onto or within the hook. Thus, for example, the hook 14 could have 2.25" wide by 2.5" high inside hook dimensions, and be made from ⅜ inch thick square or round stock.

As shown in FIG. 4, the hook 14 is molded with the receptacle 11 thereby making a one-piece bottle and towel holder 10. This embodiment of the holder 10 therefore has a fixed hook attachment location 51 with respect to a support attachment location 21a where the support ridge 30 is fixed. Depending upon the orientation of a given support structure 2, 8, and also depending upon surrounding obstructions, it may be desirable to have more flexibility in determining the hook attachment location 51. For example, if the holder 10 is attached to a wall 8, nearby obstructions may dictate that the hook 14 is most accessible when attached on the left side, the outside, or the right side of the sidewall 12 (i.e., the hook attachment location 51 is 90°, 180°, or 270°, respectively, away from the support attachment location 21).

One way to achieve more flexibility in determining the hook attachment location 51 is to make the support attachment location 21 movable. An embodiment of this method is shown in FIG. 4 wherein the permanently located support ridge 30 is replaced by an adhesive 60 (e.g., double-stick foam tape) that can be adhered anywhere on the sidewall 12 to establish any desired support attachment location 21b. (21a and 21b are two different examples of support attachment locations 21.) The adhesive 60 can be adhered to the support structure 2, 8 for a permanent attachment, or can be used to adhere a separately formed support ridge 30 to the sidewall 12 for a removable attachment of the holder 10 to the support structure 2, 8 (e.g., using the lug 34).

Another way to achieve more flexibility in determining the hook attachment location 51 is to use a moveably attached hook 14. For example, a shank 50 of the hook 14 could be adhered to the sidewall 12 using the adhesive 60. In this embodiment, the shank 50 would advantageously be long and having a flat area against the sidewall 12, as shown in FIG. 1A.

Alternative movable hook attachment methods can be generically termed "peg and socket" attachments. FIG. 1A shows a peg and socket attachment embodiment wherein the hook 14 is attached to the sidewall 12 by screws 16 (pegs). The screw 16 could be self-tapping such that the user could select any desired hook attachment location 51. Furthermore, several screw pilot holes 17 (sockets) can be pre-formed at a plurality of alternative hook attachment locations 51 around the sidewall 12. FIG. 7 shows a holder 10 with a peg and socket attachment embodiment wherein the hook 14 is attached to the sidewall 12 using a mortise 54 (socket) and tenon 52 (peg) wherein one mating part (e.g., a T-shaped tenon 54) is formed in the shank 50 of the hook 14, and the other mating part (e.g., a T-shaped mortise 52) is formed (and/or attached) at selected locations around the periphery of the sidewall 12. For example, a first mortise 52a is formed at a first hook attachment location 51a that is 90° away from the support attachment location 21 where the support ridge 30 is formed on the sidewall 12. For example, a second mortise 52b is formed at a second hook attachment location 51b that is 180° away from the support attachment location 21. FIG. 8 shows a holder 10 with a peg and socket attachment embodiment wherein the hook 14 is attached to the sidewall 12 using ball-sockets 56 (socket) and pop-beads 58 (peg) wherein one mating part (e.g., a pair of resilient split ball pop-beads 58) is formed in the shank 50 of the hook 14, and the other mating part (e.g., a pair of reverse beveled holes 56) is formed at selected hook attachment locations 51 around the periphery of the sidewall 12. For example, a first ball-socket pair 56a is formed at a first hook attachment location 51a that is 90° away from the support attachment location 21 where the support ridge 30 is formed on the sidewall 12. For example, a second ball-socket pair 56b is formed at a second hook attachment location 51b that is 180° away from the support attachment location 21.

Strap Lug Bottle and Towel Holder Alternate Embodiment

Referring now to FIGS. 9-14C, we will consider an alternate "strap lug" embodiment 70 of the inventive combined bottle and towel holder, the alternate embodiment 70 being a variant of the holder 10 presented hereinabove, but also made of plastic (e.g., molded ABS). For example, the strap lug (bottle and towel) holder 70 extends concepts of the multi-sided lug 34 and correspondingly multi-sided support ridge 30 presented hereinabove. In particular, a strap lug 72 has a sawtooth ring 86 with a perimeter having a large plurality of regularly spaced sides (compare lug sides 48), and the sawtooth ring support ridge 80 (compare support ridge 30) has an arc of locking teeth 88 with a corresponding sawtooth pattern of sides (compare ridge sides 32) that extend only part way around so that the sawtooth ring 86 of the strap lug 72 can be slid into the sawtooth ring support ridge 80 instead of being laterally inserted. The new strap lug 72 can be screwed or strapped to a support structure (e.g., wall 8, or bar 2) before or after being slid into the sawtooth ring support ridge 80. A latch 82 and flange 84 perform the functions of the tab 36 and locking pin 42 for securing a cup 76 (compare receptacle 11) to the strap lug 72 (compare lug 34). Similarly, a hook cap 74 employs a ring-shaped version of the ball 58 and socket 56 for achieving a movable attachment of the hook 14 to the cup 76 (compare receptacle 11). Other similarities and differences should become evident from the drawings and the description presented hereinbelow.

FIG. 9 shows an exploded view of the major parts of the strap lug holder 70, and FIGS. 10A-10B show an exemplary assembly of major parts. For ease of production (e.g., plastic molding) the major parts shown may, in fact, be comprised of sub components that are welded or otherwise affixed together. For example, the hook 14 may be hollow, having an upper shell and a lower shell that fit together. The hook cap 74 snaps onto the cup 76 to form an open top 13, closed bottom 15 receptacle 11 with a movably attached hook 14. After the strap lug 72 is removably attached to a support structure 2, 8 the sawtooth ring support ridge 80 on the sidewall 12 of the cup 76 slides over the sawtooth ring 86 of the strap lug 72 to engage the latch 82 and the locking teeth 88 with a latch hole 92 and the sawtooth ring 86, respectively, of the strap lug 72; thus mounting the receptacle 11 on the support structure 2, 8 at whatever angle is needed to make the strap lug holder 70 substantially vertical. The support attachment location 21 is fixed by the location of the sawtooth ring support ridge 80, but the hook attachment location 51 is movable relative to the fixed support attachment location 21.

Strap Lug

When the strap lug 72 is to be strapped onto a bar 2, any type of strap 18 can be used to wrap around the bar 2 and over strap channels 90 that are provided on the strap lug 72 (see FIG. 11C). Even a rubber band could conceivably be used, but preferably the strapping is done with inventive non-slip straps 78, described hereinbelow.

FIGS. 11A-11F show various aspects of the strap lug 72. In addition, FIG. 11C shows a portion of a non-slip strap 78 wrapped over one of the strap channels 90. A retaining ridge 91 helps to keep the strap 18, 78 in the strap channel 90. Functionally equivalent forms for the strap channel 90 include, for example, a suitably shaped hole (e.g., strap hole 20). Optionally, the strap 18, 78 is attached to the strap lug 72 (or any part of the holder 10, 70). Screw holes 40, preferably recessed for screw heads, pass perpendicularly through the strap channels 90. Screws passing through the screw holes 40 can be used to screw-attach the strap lug 72 to any support structure 2, 8, optionally in addition to a strap 18, 78, and are particularly useful for attachment to a wall 8 where straps 18, 78 cannot be used.

The sawtooth ring 86 is a circular disk that projects forward from the rest of the strap lug 72 such that the sawtooth ring 86 is able to slide into the sawtooth ring support ridge 80, and further such that there is clearance behind the sawtooth ring 86 for the flange 84 to wrap around it. The perimeter of the sawtooth ring 86 is provided with a plurality of radially outward extending teeth 87, preferably regularly spaced. For example, there are one hundred eighty triangular teeth 87 that are spaced at two degree (2°) intervals, thereby allowing 2° mounting angle adjustments to compensate for bar angle α deviations from verticality. As shown in FIG. 13D, the locking teeth 88 are corresponding (i.e., matingly shaped) teeth 87 that are correspondingly regularly spaced but extend in a much more limited arc, for example seventeen triangular (saw) teeth 87 that are spaced at 2° intervals. It is within the scope of this invention for the locking teeth 88 to be in any quantity including as few as one tooth 87. Likewise the sawtooth ring 86 can have any number of teeth 87, at any spacing, and not necessarily spaced around the entire 360° perimeter of the ring 86. For example, the teeth 87 may only extend half way around the perimeter of the sawtooth ring 86. For example, with a single tooth 87 for the locking teeth 88, the teeth 87 of the sawtooth ring 86 do not even need to be regularly spaced. Similarly, the shape of a tooth 87 is arbitrary as long as the sawtooth ring 86 mates with the locking teeth 87. Many variations on this theme should be apparent given the teaching of this disclosure.

As best seen in FIG. 11E, the back 93 of the strap lug 72 has a central concave V-shaped portion 94 bookended at both lateral edges by flat portions 95, both of which are covered by an affixed layer of soft rubber 96. The term "soft rubber" is used herein generically to mean any relatively low durometer elastomer: for example less than about 60 on the Shore A scale, preferably a 40 durometer (Shore A), 1/32 inch thick layer of rubber. The soft rubber 96 maximizes the amount of friction between the strap lug 72 and the support structure 2, 8 on which the strap lug 72 is mounted, thereby minimizing any slippage. The flat portions 95 will enable the strap lug 72 to lie flat on any flat surface 8, thereby positioning the sawtooth ring 86 substantially parallel to the flat surface 8. The V-shaped portion 94 provides at least two lines of contact between the lug back 93 and most two dimensionally curved or otherwise non-flat surfaces (e.g., a round bar 2). An internal angle β of the V-shaped portion 94 is preferably 130° but could be any angle less than 180°. For example, if the internal angle β is 90°, then the strap lug 72 could be securely mounted on a right-angled edge of a rectangular bar 2.

The latch hole 92 is a circular recess concentric with the round periphery of the sawtooth ring 86 and having a smaller diameter.

Non-Slip Strap

Two embodiments 78, 78' of the slip resistant "non-slip" strap 78 (compare generic strap 18 illustrated as a plastic cable tie), are shown in FIGS. 12A-12C. It will become obvious that the hereindisclosed non-slip strap 78, 78' may be advantageously used in a wide variety of strap-fastening applications including embodiments of the inventive bottle and towel holder 10, 70 disclosed herein. For example, the non-slip strap 78, 78' can be used anywhere that a slip resistant strap is desired for wrapping around the surface(s) of one or more objects of any shape, diameter, or circumference. For example, the non-slip strap 78, 78' can be used for slip resistantly securing two or more objects together. Exemplary applications should be evident for hospital, medical, electrical, construction, office, sewing, sailing, gardening, industry, household, recreation, drink/beverage holders, and many other uses.

Referring now to a preferred embodiment of the non-slip strap 78 illustrated in FIGS. 12A and 12B, a suitably strap-dimensioned ribbon of releasably self-adhering fabric 97, 98 is secured to a ring clasp 79 (compare clasp 19) by wrapping one end of the fabric 97 around a side of the ring clasp 79 and permanently affixing the fabric 97 to itself by any suitable means (e.g., sewn together with stitches 99). The releasably self-adhering fabric 97, 98 is any relatively thin, flexible material 97 (preferably substantially non-extensible) that has one side (a first surface 120*b* of the strap 78) covered with a releasably self-adhering component 98 that releasably adheres to itself, preferably in a way that allows repeated adherence and release of that adherence. For example, the releasably self-adhering component 98 is a combined hook and loop material that incorporates both the loops and the hooks intermingled in the same face of the fabric (e.g., Velcro® "Snag-Free" One-Piece design sew-on tape). For example, more conventionally the releasably self-adhering component 98 is a two component combined hook and loop material comprising a first length of hook material followed by a second length of mating loop material (e.g., using standard two-part Velcro®). For example, the releasably self-adhering component 98 is a releasable adhesive.

In order to make the non-slip strap 78 resist sliding when wrapped around a bar 2 (especially a slippery bar like a round, chrome plated rod), a layer of soft rubber 96 (low durometer elastomer) is affixed, by any suitable means, to a second surface 120a of the strap 78, i.e., the side of the fabric 97 opposite to the side having the releasably self-adhering component 98. For example, the soft rubber 96 is sewn with stitches 99 onto the second surface 120a. For example, the soft rubber 96 is a thin layer liquid coated and dried on the second surface 120a. For example, the soft rubber 96 and the fabric 97 are laminated together (using adhesive, ultrasonic welding, etc.). Thus, with the soft rubber side 120a facing inward, the non-slip strap 78 can be wrapped around the strap channel 90 of the strap lug 72 (or through a strap hole 20, or otherwise be attached to the strap lug 72 or holder 10, 70) and also around a bar 2 against which the holder 10, 70 is positioned, then the free end of the non-slip strap 78 is passed through its ring clasp 79, cinched tight, and removably secured by laying its releasably self-adhering component 98 side 120b back on itself for mating contact, and pressing for self-adherence. The result of this operation is shown in FIG. 11C. Thus the slip resistant back surface 93 of the strap lug 72 is tightly held against a portion of the periphery of the bar 2 by the strap 78 which has its slip resistant surface 96 tightly held against the remainder of the periphery of the bar 2, thereby providing a releasable slip resistant attachment of the strap lug 72 (and an attached holder 70) to the bar 2 member of a support structure.

An alternate embodiment of the non-slip strap 78 is a slip resistant claspless strap 78' illustrated in FIG. 12C. For this embodiment, a suitably strap-dimensioned ribbon of releasably self-adhering fabric 97 (preferably flexible but substantially non-extensible) has a first side (surface) 120b covered with a first releasably self-adhering component 98b (e.g., loop fabric as in standard two-component Velcro®); and has a portion of the opposed, second side 120a covered with a second releasably self-adhering component 98a (e.g., hook fabric as in standard two-component Velcro®). The remainder of the second side 120a has a layer of soft rubber 96 affixed thereupon. Of course the first and second releasably self-adhering components 98b, 98a could be any suitable material, including for example, adhesive, or one-piece intermingled hook and loop fabric.

In the exemplary illustration of FIG. 12C, the claspless strap 78' is comprised of a bottom 120b layer of loop fabric 97b with a downward (outward) facing loop type of releasably self-adhering component 98b; and affixed to its top surface 120a is a top layer comprising a first portion of hook fabric 97a with an upward (outward) facing hook type of releasably self-adhering component 98a, followed by a second (remaining) portion of soft rubber 96. Thus, with the soft rubber 96 side 120a facing inward, the claspless non-slip strap 78' can be wrapped around the strap channel 90 of the strap lug 72 (or through a strap hole 20, or otherwise be attached to the strap lug 72 or holder 10, 70) and also around a bar 2 against which the holder 10, 70 is positioned, then the two ends of the claspless non-slip strap 78' are pulled tight and removably secured by overlapping them such that the second releasably self-adhering component 98b on the rubber side 120a of the strap 78' is matingly contacting (e.g., on top of) the first releasably self-adhering component 98a on the opposed side 120b of the strap 78'; and finally pressing the overlapped ends together for self-adherence.

Given the teaching hereinabove, it should be apparent that the second side 120a of the claspless non-slip strap 78' can also be constructed, for example, by affixing the soft rubber layer 96 between two end portions comprised of the second releasably self-adhering component 98b. In another example, the soft rubber layer 96 could be one or more strips that extend the full length of the second side 120a of the claspless non-slip strap 78' but do not extend laterally across the whole width of the second side 120a; and the second releasably self-adhering component 98b could be formed into one or more full length strips in the portion(s) of the width not covered by the soft rubber layer 96.

Cup

FIGS. 13A-13E show various aspects and features of the cup 76. The cup 76 is generally round and cup-shaped with a closed bottom 15 and an open top 13. Optionally (not shown), the closed bottom 15 can have drain holes or even a grating to allow spilled fluids and debris to drain, i.e., the bottom 15 is "closed" in the sense that a bottle 4 cannot fall through it.

The sawtooth ring support ridge 80 is shaped like an inverted U wherein the rounded portion is a semicircle with a diameter slightly greater than the diameter of the sawtooth ring 86. The legs of the inverted U extend downward somewhat in order to provide a lead-in guide for sliding in the sawtooth ring 86, therefore the legs may be angled slightly outward. The flange 84 is a lip that extends radially inward from portions of the semicircular part of the sawtooth ring support ridge 80. The locking teeth 88 are positioned at the approximate top of the sawtooth ring support ridge 80 and extend radially inward. A portion 85 of the cup side is flattened and the ridge 80 is extended outward as needed so that the flange 84 can be in a single plane that is parallel to the plane of the flattened side portion 85. Thus the flat disk shape of the sawtooth ring 86 can be securely held to the cup 76 between the flattened side portion 85 and the flange 84. Furthermore, the sawtooth ring 86 has a disk diameter and thickness that are dimensioned to closely fit within the flanged support ridge, thereby enabling a secure lug-to-cup attachment.

A latch 82 has a laterally outward extending circular latch button 100 that is canted relative to the flattened side portion 85 such that the bottom edge of the latch button 100 is substantially flush with the flattened side portion 85, and the top edge of the latch button 100 is canted outward from the flattened side portion 85. The latch button 100 is spring biased outward from the flattened side portion 85, preferably by a latch spring 102 formed out of the sidewall 12 of the cup 76 by making an inverted U shaped cut around the latch button 100, effectively making the latch 82 tongue shaped. The latch button 100 is shown as a circle, but could be any shape that is similarly ramped and has a top, canted-out portion that conforms to the position of the illustrated latch button 100. For example, a thin ridge could angle up and outward to a top edge at the top middle (12 o'clock) of the illustrated circle 100. The latch button 100, and most importantly the top portion of it, are confined to a circle having a diameter slightly less than the diameter of the latch hole 92, wherein the circle is centered on the semi-circular center point of the sawtooth ring support ridge 80.

A latch handle 104 is attached to the back (inward) side of the latch 82 and extends upward slightly above the open top 13 of the cup 76. Pushing radially inward on the exposed top of the latch handle 104 opposes the bias of the latch spring 102 and tilts the latch button 100 inward. For the purpose of plastic part molding, the latch handle 104 is a separately formed plastic piece that is "welded" to the back of the latch 82. In order to limit the travel of the latch handle 104, a double bend portion of the latch handle 104 has a limit slot 108 cut out of it, and a limit post 106 is molded into the cup 76 such that it extends upward through the limit slot 108 when the latch handle 104 is attached to the cup 76.

In use, when the sawtooth ring 86 slides up into the sawtooth ring support ridge 80 it is held against the flattened side portion 85 by the flange 84 and therefore pushes the latch 82 inward as it rides up along the canted latch button 100. When the sawtooth ring 86 reaches the top of the sawtooth ring support ridge 80 and matingly engages the sawtooth ring teeth 87 with the locking teeth 88, the top edge of the latch hole 92 will also pass above the top of the latch button 100, thereby allowing the latch spring 102 biased latch button 100 to pop back outward and into the latch hole 92 to latch the strap lug 72 and the cup 76 together in a fixed orientation relative to each other. Pushing the latch handle 104 inward will, allow the sawtooth ring 86 to be moved downward, either for complete removal, or enough to disengage the sawtooth ring teeth 87 and the locking teeth 88 so that the cup 76 can be rotated relative to the strap lug 72 for adjusting the verticality of the cup 76. It should be noted that although the cup 76 and strap lug 72 can be latched together quite easily, they cannot be unlatched (released, removed) unless the latch handle 104 is accessible. When the hook cap 74 is snapped in place on top of the cup 76, the latch handle 104 is hidden and inaccessible. This feature provides some tamper resistance and also some assurance that the latch 82 will not be inadvertently released.

In order to enable snapping on the hook cap 74 there is a laterally outward opening annular indentation 110 around the open top edge 13 of the cup 76.

Hook Cap

FIGS. 14A-14C illustrate the hook cap 74. Its main purpose is to rotationally movably attach the hook 14 to the cup 76. Secondarily the hook cap 74 also provides a finished rounded edge 114 at the open top 13, and resilient gripping fingers 116 to form the inside of the assembled receptacle 11. Furthermore, as mentioned above, the hook cap 74 also hides the latch handle 104.

As best seen in FIG. 14C, the annular ring shaped rounded top edge 114 has a cross-section that is concave opening downward. The inside of the radially outer wall has an inward extending annular ridge 112 that mates with the outward facing annular indentation 110 of the cup 76. Since both the cup 76 and the hook cap 74 are made of semi-rigid resilient material (e.g., plastic, preferably ABS), the hook cap 74 can be forced over the top of the cup 76 and the annular ridge 112 (like the ball 58) will snap into the annular indentation 110 (like the socket 56). Since the ridge and indentation are annular, the hook cap 74 can be rotated before or after being mated in order to position the movable hook 14 at a hook attachment location 51 that can be anywhere around the perimeter of the cup 76 except, of course, where the sawtooth ring support ridge 80 interferes at the support attachment location 21 (see FIGS. 10A-10B). In other words, the hook 14 is rotationally movably attached to the receptacle 11. A shank 50 of the hook 14 is connected to the rounded top edge 114 and extends downward with a shape that conforms to the shape of the sidewall 12 of the cup 76, thereby providing support for the hanging hook 14 as well as a neat, unified appearance. It should be apparent that the annular ridge 112 and annular indentation 110 could equally well be located on the opposite surfaces, i.e., on the cup 76 and on the hook cap 74, respectively. Furthermore, the annular ridge 112 and annular indentation 110 do not have to have any particular profile as long as they mate, and they may even be discontinuous around the perimeter (e.g., the annular ridge 112 could be comprised of a string of hemispherical bumps).

To make the assembled bottle and towel holder 70 even more tamper-resistant, the hook cap can be easily limited to specific rotational positions. In a preferred embodiment of this, vertical ribs are placed at intervals (e.g., 30°) around the concave inside of the hook cap annular top edge 114. The latch handle 104 will then rest between two ribs when the hook cap 74 is snapped onto the cup 76, thereby preventing rotation of the hook cap 74 after the bottle and towel holder 70 is assembled.

A plurality of resilient gripping fingers 116 extend downward from the rounded top edge 114 to form the inside of the receptacle 11 once the hook cap 74 and cup 76 are assembled. Preferably each finger 116 is reinforced by a vertical stiffening rib 117. Thus the fingers 116 enable the receptacle 11 to grip a bottle 4 and to accommodate irregularities in its contour while preventing rattling or shaking loose of the bottle 4 that is in a receptacle 11 attached to a unit of exercise equipment that may be vigorously shaken by use.

Conclusion

Thus the present invention provides apparatus and method for a combined bottle and towel holder 10, 70 that is a compact assembly that can be removably attached directly and easily to a variety of support structures 2, 8 such as are extant in an exercise or fitness room. As disclosed hereinabove, the bottle holding portion is an open topped 13 receptacle 11 suitable for holding a spray bottle 4 (or other objects), and the towel holding portion is an upward opening hook 14, preferably located 51 conveniently on the sidewall 12 of the receptacle 11, more preferably movably located 60, 52, 54, 56, 58, 74, 110, 112 relative to the attachment location 21 of the receptacle 11 to the support structure 2, 8.

The inventive holder 10, 70 is removably attachable 18, 78, 78', 20, 90, 22, 88, 30, 80, 34, 72, 38, 86, 87, 42, 84, 82, 92 to a frame member of a piece of equipment in a way that substantially vertically (V) orients the longitudinal axis LA of the receptacle 11, wherein the frame member is a bar 2 of no particular cross-sectional shape (e.g., rectangular or circular), and is preferably upstanding (lying in a vertical plane) but is oriented such that a long axis of the bar 2 is vertical, horizontal or at a bar tilt angle α between horizontal and vertical. Furthermore, the holder 10, 70 and/or its attachment strap 18, 78, 78' can be made slip resistant by affixing a layer of soft rubber 96 (i.e., a low durometer resilient material) on it. Finally, the holder 10, 70 is also removably attachable 20, 22, 88, 30, 80, 34, 72, 38, 86, 40, 41, 42, 84, 82, 92 to a vertical surface (e.g., a wall 8).

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A bottle and towel holder for mounting on a support structure, the holder comprising:
    a receptacle having a longitudinal axis, a lateral sidewall and an open top;
    a towel-holding hook extending laterally outward from the sidewall;
    an inverted U shaped support ridge protruding laterally outward from the sidewall, and having a top and an outer edge, the support ridge being semicircular at the top with a radially inward extending flange along the outer edge; and
    a radially inward extending locking tooth inside wherein the support ridge can be used to mount the bottle and towel holder on the support structure by means of an intermediary lug that can be attached to the support structure and which adjustably mates with the support ridge.

2. The bottle and towel holder of claim 1, further comprising:
    the lug comprising a circular disk with a plurality of radially outward extending teeth such that:
    the disk diameter and thickness are dimensioned to closely fit within the flanged support ridge; and
    the teeth will matingly engage with the locking tooth when the lug is fully inserted into the flanged support ridge.

3. The bottle and towel holder of claim 2, wherein the lug further comprises:
    a screw hole for screw-attachment of the lug to the support structure.

4. The bottle and towel holder of claim 2, wherein the lug further comprises:
    a strap channel; and
    a strap for passing through the strap channel and then wrapping around a bar member of the support structure.

5. The bottle and towel holder of claim 4, wherein the lug further comprises:
    a back surface comprised of a low durometer elastomer layer.

6. The bottle and towel holder of claim 5, wherein:
    the lug back surface comprises a central concave V-shaped portion bookended at both lateral edges by flat portions.

7. The bottle and towel holder of claim 4, wherein:
    the strap has a surface comprised of a low durometer elastomer layer.

8. The bottle and towel holder of claim 7, wherein the strap further comprises:
    a ring clasp; and
    a flexible fabric that has one side covered with a releasably self-adhering component.

9. The bottle and towel holder of claim 2, further comprising:
    a latch hole recessed in the axial face of the disk; and
    a latch button on the sidewall that is biased laterally outward and positioned to engage with the latch hole when the lug is fully inserted into the support ridge.

10. The bottle and towel holder of claim 9, further comprising:
    a latch handle hidden inside the receptacle and attached to the latch button for disengaging the latch button by moving the latch button laterally inward in opposition to the bias.

11. The bottle and towel holder of claim 9, further comprising:
    an annular ring shaped cap that snaps onto the open top of the receptacle such that the cap hides the latch handle.

12. The bottle and towel holder of claim 1, further comprising:
    an annular ring shaped hook cap that snaps onto the open top of the receptacle; wherein:
    the annular ring has a cross-section that is concave opening downward, thereby forming a rounded top edge; and
    the hook is connected to the rounded top edge.

13. The bottle and towel holder of claim 12, wherein:
    a shank of the hook is connected to the rounded top edge and extends downward with a shape that conforms to the shape of the sidewall.

14. The bottle and towel holder of claim 12, further comprising:
    a radially outward opening annular indentation or ridge around the open top of the receptacle; and
    a corresponding inward extending annular ridge or indentation, respectively, inside of a radially outer wall of the hook cap; wherein the annular ridge rotationally moveably mates with the annular indentation for enabling rotation of the hook cap and hook around the sidewall of the receptacle.

* * * * *

UNITED STATES PATENT AND TRADEMARK OFFICE
CERTIFICATE OF CORRECTION

PATENT NO. : 7,275,729 B2  Page 1 of 1
APPLICATION NO. : 11/209903
DATED : October 2, 2007
INVENTOR(S) : Bruce A. Sherman It is certified that error appears in the above-identified patent and that said Letters Patent is hereby corrected as shown below:

Column 21, Row, 18, after the words "locking tooth inside", the following should be inserted, --the top of the support ridge;--

Signed and Sealed this

Fifteenth Day of April, 2008

JON W. DUDAS
*Director of the United States Patent and Trademark Office*